US012652241B2

(12) United States Patent
Menon et al.

(10) Patent No.: US 12,652,241 B2
(45) Date of Patent: Jun. 9, 2026

(54) PROTOCOL INDEPENDENT MULTICAST (PIM) ACROSS TRANSPORT NETWORK

(71) Applicant: Juniper Networks, Inc., Sunnyvale, CA (US)

(72) Inventors: Abilash Menon, Boxborough, MA (US); Robert W. Kebler, Newburyport, MA (US); Jacob Harrison Fitzharris, Johnson City, TN (US)

( * ) Notice: Subject to any disclaimer, the term of this patent is extended or adjusted under 35 U.S.C. 154(b) by 0 days.

(21) Appl. No.: 18/400,947

(22) Filed: Dec. 29, 2023

(65) Prior Publication Data

US 2025/0007827 A1 Jan. 2, 2025

Related U.S. Application Data

(60) Provisional application No. 63/510,771, filed on Jun. 28, 2023.

(51) Int. Cl.
| | |
|---|---|
| *H04L 45/02* | (2022.01) |
| *H04L 45/00* | (2022.01) |
| *H04L 45/74* | (2022.01) |

(52) U.S. Cl.
CPC ............ *H04L 45/566* (2013.01); *H04L 45/04* (2013.01); *H04L 45/74* (2013.01)

(58) Field of Classification Search
CPC ...... H04L 45/566; H04L 45/745; H04L 45/16
See application file for complete search history.

(56) References Cited

U.S. PATENT DOCUMENTS

| | | | |
|---|---|---|---|
| 6,108,710 A | 8/2000 | Brabson et al. | |
| 6,507,577 B1 | 1/2003 | Mauger et al. | |
| 6,563,835 B1 | 5/2003 | Chen | |
| 6,587,438 B1 | 7/2003 | Brendel | |

(Continued)

FOREIGN PATENT DOCUMENTS

| | | |
|---|---|---|
| CN | 102971991 A | 3/2013 |
| CN | 107547335 A | 1/2018 |

(Continued)

OTHER PUBLICATIONS

Extended Search Report from counterpart European Application No. 24185508.9 dated Nov. 4, 2024, 16 pp.

(Continued)

*Primary Examiner* — Hua Fan

(57) ABSTRACT

Techniques are disclosed for sending Protocol Independent Multicast (PIM) messages across a Layer-3 (L3) transport network. In one example, a first network device receives, via an L2 network from a multicast sender device, a multicast packet for a multicast group associated with a multicast service. The first network device generates, based on the multicast packet, a unicast L3 packet comprising a PIM register request configured to register the first network device as a multicast source for the multicast group. A header of the unicast L3 packet specifies a source address comprising a network address translation (NAT) to an address of a virtual loopback interface of a second network device. The virtual loopback interface is associated with a PIM service between the first and second network devices for the multicast service. The first network device forwards the unicast L3 packet across an L3 transport network to the second network device.

21 Claims, 11 Drawing Sheets

(56) References Cited

U.S. PATENT DOCUMENTS

| | | | |
|---|---|---|---|
| 6,982,966 | B2 | 1/2006 | Eidenschink et al. |
| 8,472,438 | B2 | 6/2013 | Kini |
| 8,576,844 | B1 | 11/2013 | Ghosh |
| 9,124,529 | B1 | 9/2015 | Chadha |
| 9,729,439 | B2 | 8/2017 | MeLampy et al. |
| 9,729,682 | B2 | 8/2017 | Kumar et al. |
| 9,762,485 | B2 | 9/2017 | Kaplan et al. |
| 9,871,748 | B2 | 1/2018 | Gosselin et al. |
| 9,985,883 | B2 | 5/2018 | MeLampy et al. |
| 9,992,154 | B2 | 6/2018 | Bickhart et al. |
| 10,200,264 | B2 | 2/2019 | Menon et al. |
| 10,277,506 | B2 | 4/2019 | Timmons et al. |
| 10,432,522 | B2 | 10/2019 | Kaplan et al. |
| 10,630,509 | B2 | 4/2020 | Bickhart et al. |
| 10,958,564 | B1 | 3/2021 | Asthana et al. |
| 11,005,749 | B2 | 5/2021 | Kaplan et al. |
| 11,070,465 | B2 | 7/2021 | Kaplan et al. |
| 11,075,824 | B2 | 7/2021 | McCulley et al. |
| 11,165,863 | B1 | 11/2021 | Timmons et al. |
| 11,477,115 | B2 | 10/2022 | Zdeb |
| 11,546,249 | B2 | 1/2023 | Menon et al. |
| 11,695,687 | B2 | 7/2023 | Kaplan et al. |
| 2003/0133450 | A1 | 7/2003 | Baum |
| 2003/0154297 | A1 | 8/2003 | Suzuki et al. |
| 2005/0091313 | A1 | 4/2005 | Zhou et al. |
| 2005/0114656 | A1 | 5/2005 | Liu et al. |
| 2005/0169270 | A1 | 8/2005 | Mutou et al. |
| 2006/0062214 | A1 | 3/2006 | Ng et al. |
| 2006/0114904 | A1 | 6/2006 | Lee |
| 2006/0221962 | A1* | 10/2006 | Previdi ............... H04L 45/16 |
| | | | 370/432 |
| 2007/0002858 | A1 | 1/2007 | Bichot et al. |
| 2007/0008949 | A1 | 1/2007 | Balandin |
| 2007/0058638 | A1 | 3/2007 | Guichard et al. |
| 2007/0115973 | A1 | 5/2007 | Koga et al. |
| 2007/0177511 | A1 | 8/2007 | Das et al. |
| 2008/0062891 | A1 | 3/2008 | Van der Merwe et al. |
| 2008/0170570 | A1 | 7/2008 | Moskaluk et al. |
| 2009/0003354 | A1 | 1/2009 | Sreejith et al. |
| 2009/0080345 | A1 | 3/2009 | Gray |
| 2009/0097418 | A1 | 4/2009 | Castillo et al. |
| 2009/0116404 | A1 | 5/2009 | Mahop et al. |
| 2010/0043067 | A1 | 2/2010 | Varadhan et al. |
| 2010/0132028 | A1 | 5/2010 | Wang et al. |
| 2011/0032844 | A1 | 2/2011 | Patel et al. |
| 2011/0058544 | A1 | 3/2011 | Sardesai et al. |
| 2012/0069740 | A1 | 3/2012 | Lu et al. |
| 2012/0218883 | A1 | 8/2012 | Xu et al. |
| 2012/0218994 | A1 | 8/2012 | Zheng |
| 2012/0281520 | A1 | 11/2012 | Ansari et al. |
| 2013/0089093 | A1 | 4/2013 | Bacthu et al. |
| 2013/0107725 | A1 | 5/2013 | Jeng et al. |
| 2013/0219035 | A1 | 8/2013 | Detienne et al. |
| 2014/0010117 | A1 | 1/2014 | Lindem, III et al. |
| 2014/0129735 | A1 | 5/2014 | Thyni et al. |
| 2014/0195666 | A1 | 7/2014 | Dumitriu et al. |
| 2014/0280813 | A1 | 9/2014 | Ramachandran et al. |
| 2014/0281027 | A1 | 9/2014 | Gast et al. |
| 2014/0355415 | A1 | 12/2014 | Mandal et al. |
| 2015/0092776 | A1 | 4/2015 | Wijnands |
| 2015/0381515 | A1 | 12/2015 | Mattson et al. |
| 2016/0226762 | A1 | 8/2016 | Zhang et al. |
| 2016/0321341 | A1 | 11/2016 | Ramamurthi |
| 2016/0352631 | A1 | 12/2016 | Medved et al. |
| 2017/0019428 | A1 | 1/2017 | Cohn |
| 2017/0093636 | A1 | 3/2017 | Chanda et al. |
| 2017/0250906 | A1 | 8/2017 | MeLampy et al. |
| 2017/0331694 | A1 | 11/2017 | Crickett et al. |
| 2017/0339046 | A1 | 11/2017 | Gast et al. |
| 2017/0346691 | A1 | 11/2017 | Crickett et al. |
| 2017/0346707 | A1 | 11/2017 | Menon et al. |
| 2017/0346854 | A1 | 11/2017 | Kumar et al. |
| 2017/0373973 | A1 | 12/2017 | Bickhart et al. |
| 2018/0041555 | A1 | 2/2018 | Manohar et al. |
| 2018/0062932 | A1 | 3/2018 | Cohn et al. |
| 2018/0102965 | A1 | 4/2018 | Hari et al. |
| 2018/0278514 | A1 | 9/2018 | Chadha |
| 2018/0314706 | A1 | 11/2018 | Sirton et al. |
| 2018/0343196 | A1 | 11/2018 | Baj et al. |
| 2019/0028577 | A1 | 1/2019 | D'Souza et al. |
| 2019/0104206 | A1 | 4/2019 | Goel et al. |
| 2019/0109770 | A1 | 4/2019 | Pugaczewski |
| 2019/0116053 | A1 | 4/2019 | Allan |
| 2019/0155935 | A1 | 5/2019 | Walker |
| 2019/0229937 | A1 | 7/2019 | Nagarajan et al. |
| 2020/0012737 | A1 | 1/2020 | Rayaroth et al. |
| 2020/0106640 | A1 | 4/2020 | Labonte et al. |
| 2020/0314016 | A1 | 10/2020 | Dutta |
| 2020/0366589 | A1 | 11/2020 | Kaplan et al. |
| 2020/0366590 | A1 | 11/2020 | Kaplan et al. |
| 2020/0366593 | A1 | 11/2020 | Kaplan et al. |
| 2020/0366594 | A1 | 11/2020 | Kaplan et al. |
| 2020/0366598 | A1 | 11/2020 | Kaplan et al. |
| 2020/0366599 | A1 | 11/2020 | Kaplan et al. |
| 2020/0403890 | A1 | 12/2020 | McCulley et al. |
| 2021/0211324 | A1 | 7/2021 | Dutta |
| 2021/0226912 | A1 | 7/2021 | Ranpise et al. |
| 2021/0243111 | A1 | 8/2021 | Dutta |
| 2021/0399975 | A1 | 12/2021 | Kaplan et al. |
| 2021/0409322 | A1 | 12/2021 | Menon et al. |
| 2021/0409323 | A1 | 12/2021 | Menon et al. |
| 2022/0131921 | A1 | 4/2022 | Turnbull et al. |
| 2022/0200915 | A1 | 6/2022 | Timmons |
| 2023/0008913 | A1 | 1/2023 | Menon et al. |
| 2023/0009482 | A1 | 1/2023 | Menon et al. |

FOREIGN PATENT DOCUMENTS

| | | | |
|---|---|---|---|
| CN | 107566263 | A | 1/2018 |
| CN | 110324226 | A | 10/2019 |
| EP | 1185041 | A2 | 3/2002 |
| EP | 2124385 | A1 | 11/2009 |
| EP | 1741247 | B1 | 4/2012 |
| EP | 3198822 | A1 | 8/2017 |
| WO | WO-2019228622 | A1 * | 12/2019 ............. H04L 45/28 |

OTHER PUBLICATIONS

Fenner et al., "Protocol Independent Multicast—Sparse Mode (PIM-SM): Protocol Specification (Revised)", rfc7761, Internet Engineering Task Force, Mar. 12, 2016, 137 pp.

Verrydt et al., "Study of IPv6 Multicast Deployment in MPLS Networks", International Multi-Conference on Computing in the Global Information Technology (ICCGI'06), IEEE, Aug. 2006, 6 pp.

"Transmission Control Protocol," RFC 793, Sep. 1981, 91 pp.

(No Author) 128 Technology, "Session Smart RoutingTM: How it Works," Technical Whitepaper, 15 pages (Mar. 2018).

(No Author) 128 Technology, Application Classification Solution Note, 11 pages (Aug. 2017).

(No Author) 128 Technology, Failsafe Delivery Whitepaper, 13 pages (Sep. 2017).

(No Author) 128 Technology, Hypersegmentation Under the Hood Whitepaper, 9 pages (Aug. 2018).

(No Author) 128 Technology, Multipoint Secure Vector Routing Whitepaper, 9 pages (Jun. 2017).

(No Author) 128 Technology, Network Security with 128 Networking Platform Whitepaper, 12 pages (Sep. 2019).

(No Author) 128 Technology, Quality of Service Whitepaper, 6 pages (Oct. 2019).

(No Author) 128 Technology, Resiliency Whitepaper, 9 pages (Sep. 2017).

(No Author) 128 Technology, Step Solution Note, 9 pages (Aug. 2017).

(No Author) Enhanced Interior Gateway Routing Protocol (EIGRP) Wide Metrics Whitepaper, Cisco, 14 pages (Feb. 2016).

Atlas A., et al., "Performance Based Path Selection for Explicitly Routed Label Switched Paths (LSPs) Using TE Metric Extensions," 10 pages (May 2016).

(56)        References Cited

OTHER PUBLICATIONS

Berners-Lee et al. "Uniform Resource Identifier (URI): Generic Syntax," Network Working Group; RFC 3986, Jan. 2005, 62 pp.
Bryan et al., "JavaScript Object Notation {JSON) Patch," Internet Engineering Task Force (IETF); RFC 6902, Apr. 2013, 19 pp.
Caria M., et al., "SDN Partitioning: A Centralized Control Plane for Distributed Routing Protocols," Preliminary Version / Preprint, 14 pages (Apr. 2016).
Cordero JA, "Link-State Routing Optimization for Compound Autonomous Systems in the Internet," 77 pages (2011). Applicant points out in accordance with MPEP 609.04(a) that the 2011 year of publication is sufficiently earlier than the effective U.S. filing date of the present application, and any foreign priority date that the particular month of publication is not in issue.
Crawley E., et al., "A Framework for QoS-based Routing in the Internet," 37 pages (Aug. 1998).
Estrin et al., "Protocol Independent Multicast-Sparse Mode (PIM-SM): Protocol Specification," Network Working Group, RFC 2362, 66 pp.
Ferro G., "Response: Distributed? Centralized? Both?—Cisco Blog on OnePK and SDN," Blog Post, 7 pages (Jul. 2012).
Filsfils C., "Segment Routing Architecture," Internet Engineering Task Force (IETF), 32 pages (Jul. 2018).
George W., et al., Time Warner Cable et al., "Autonomous System Migration Mechanisms and Their Effects on the BGP as PATH Attribute," 16 pages (Nov. 2015).
Hao et al., "TRILL Integrated Routing and Bridging Solution; draft-bao-trill-irb-02.txt," Internet Draft, Jul. 12, 2013, 10 pp.
IP Performance Measurement (ippm) documents, 15 pages (retrieved from: https://datatracker.ietf.org/wg/ippm/documents/) (Jun. 2020).
Juniper Networks, "Juniper Networks EVPN Implementation for Next-Generation Data Center Architectures", White Papers, Jul. 2015, 62 pp.
Katz et al., "Bidirectional Forwarding Detection (BFD) for IPv4 and IPv6 (Single Hop)," Internet Engineering Task Force (IETF), RFC. 5881, Jun. 2010, 7 pp.

Katz et al., "Bidirectional Forwarding Detection (BFD)," Internet Engineering Task Force (IETF), RFC 5880, Jun. 2010, 49 pp.
Menon et al., "Secure Vector Routing (SVR)," Network Working Group Internet-Draft: draft-menon-svr-00, Oct. 1, 2021, 37 pp.
Menon et al., "Secure Vector Routing (SVR)," Network Working Group Internet-Draft: draft-menon-svr-02, Sep. 20, 2022, 96 pp.
Menon et al., "Secure Vector Routing (SVR)," Network Working Group, Internet-Draft: draft-menon-svr-01, Mar. 29, 2022, 76 pp.
Postel, "User Datagram Protocol," RFC 768, Aug. 28, 1980, 3 pp.
Rekhter Y., et al., Chrysler Corp., et al., "Address Allocation for Private Internets," 9 pages (Feb. 1996).
Sajassi et al., "Integrated Routing and Bridging in EVPN", draft-ietf-bess-evpn-inter-subnet-forwarding-01 L2VPN Workgroup, Oct. 2015, 26 pp.
Sollins et al., "Functional Requirements for Uniform Resource Names," Network Working Group; RFC 1737, Dec. 1994, 7 pp.
U.S. Appl. No. 17/314,268, filed May 7, 2021, naming inventors Kaplan et al.
Vissicchio S., et al., "Central Control over Distributed Routing," 14 pages (Aug. 2015).
Wijnands I.J., et al., Cisco Systems, et al., "PIM Flooding Mechanism (PFM) and Source Discovery (SD)," 18 pages (Mar. 2018).
Younis O., et al., "Constraint-Based Routing in the Internet: Basic Principles and Recent Research," IEEE Communications Surveys and Tutorials, vol. 5, Issue No. 1, Third Quarter, 15 pages (2003) Applicant points out in accordance with MPEP 609.04(a) that the 2003 year of publication is sufficiently earlier than the effective U.S. filing date of the present application, and any foreign priority date that the particular month of publication is not in issue.
He et al., "Research on QoS of IP Network", vol. 1, Telecom Express, Jan. 25, 2004, 5 pp.
Decision on Appeal from U.S. Appl. No. 17/314,268 dated Jul. 31, 2025, 14 pp.
Response to Extended Search Report dated Nov. 4, 2024, from counterpart European Application No. 24185508.9 filed Jun. 30, 2025, 47 pp.

* cited by examiner

300A

MPLS-CORE
310

NG-MVPN

PE ROUTER 312A        PE ROUTER 312B        MX-PE

PIM-RP + MSDP

CE ROUTER 314A        CE ROUTER 314B        MX-CE

ROUTER
316A

ROUTER
316B

SATELLITE NETWORK
318

PIM-SM over GRE

ROUTER
320

ROUTER 322        SRX

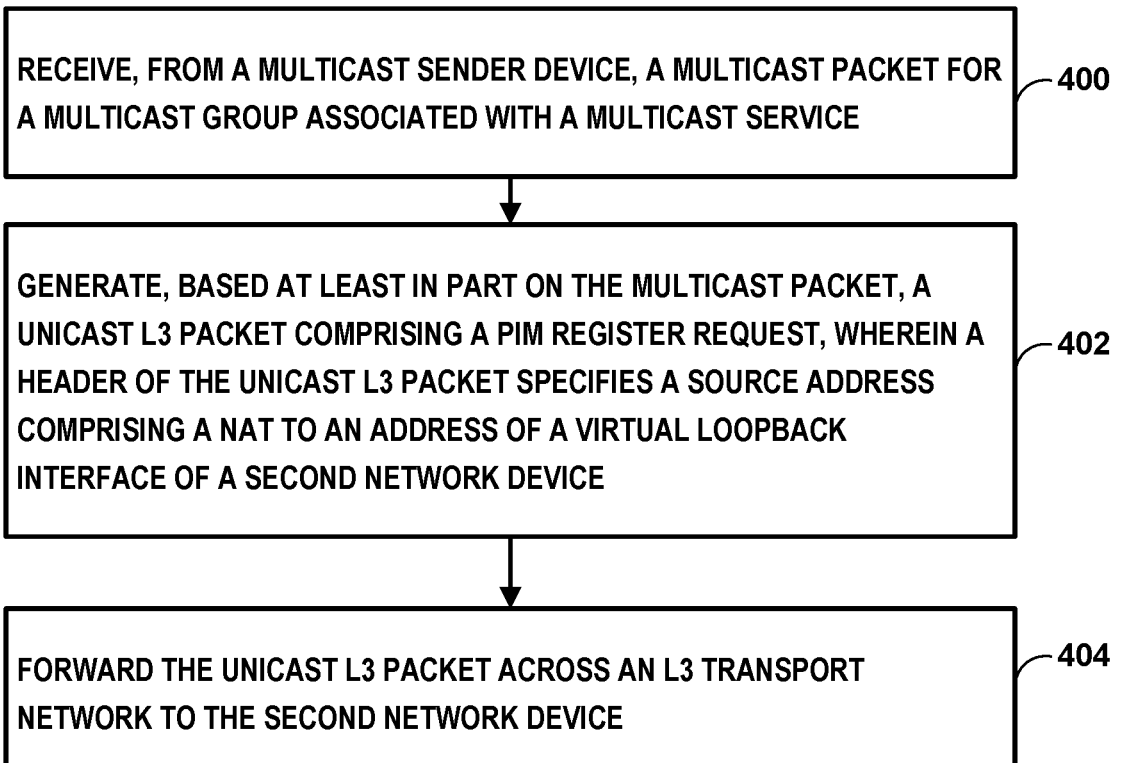

RECEIVE, FROM A MULTICAST SENDER DEVICE, A MULTICAST PACKET FOR A MULTICAST GROUP ASSOCIATED WITH A MULTICAST SERVICE ⟶400

GENERATE, BASED AT LEAST IN PART ON THE MULTICAST PACKET, A UNICAST L3 PACKET COMPRISING A PIM REGISTER REQUEST, WHEREIN A HEADER OF THE UNICAST L3 PACKET SPECIFIES A SOURCE ADDRESS COMPRISING A NAT TO AN ADDRESS OF A VIRTUAL LOOPBACK INTERFACE OF A SECOND NETWORK DEVICE ⟶402

FORWARD THE UNICAST L3 PACKET ACROSS AN L3 TRANSPORT NETWORK TO THE SECOND NETWORK DEVICE ⟶404

FIG. 4

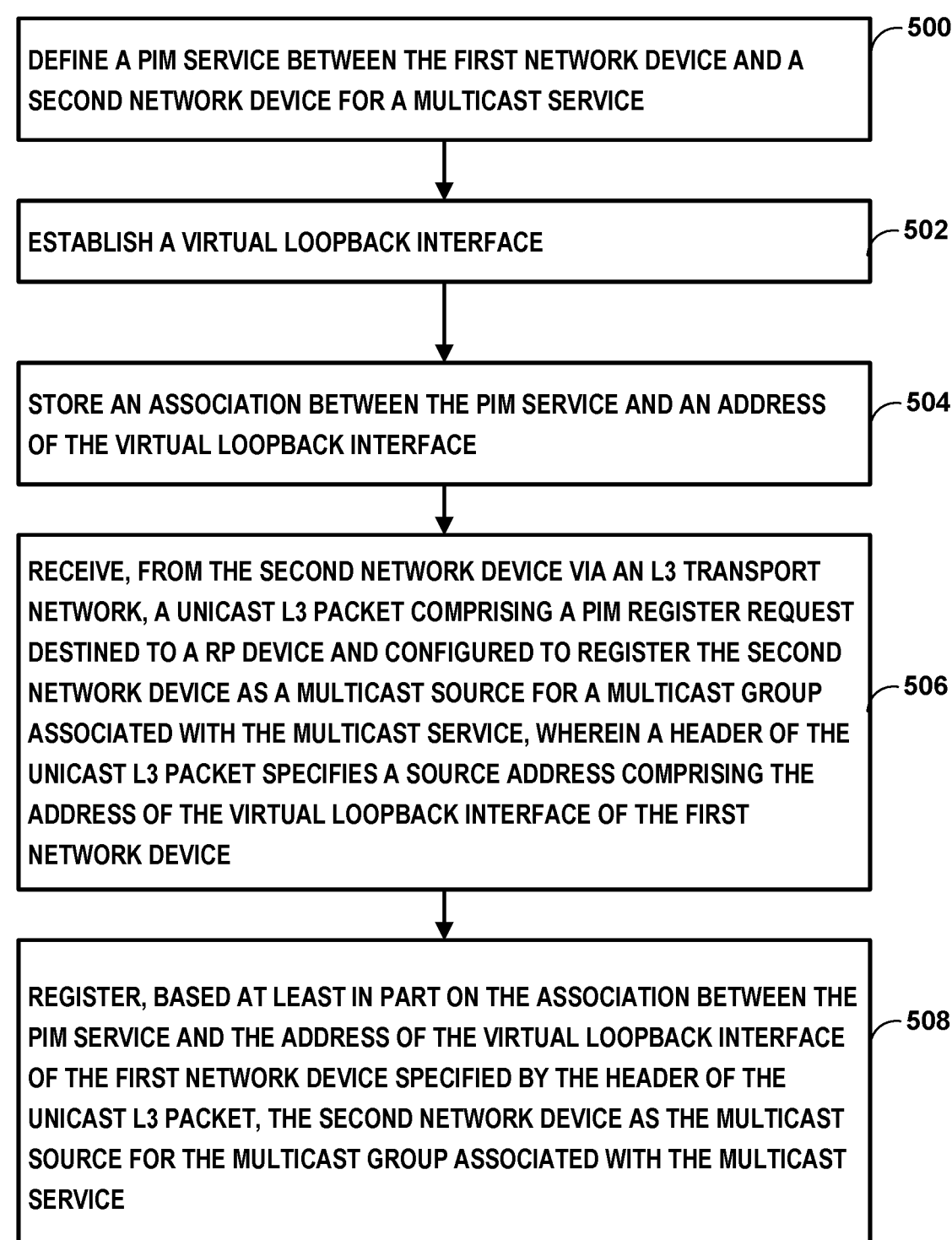

DEFINE A PIM SERVICE BETWEEN THE FIRST NETWORK DEVICE AND A SECOND NETWORK DEVICE FOR A MULTICAST SERVICE — 500

ESTABLISH A VIRTUAL LOOPBACK INTERFACE — 502

STORE AN ASSOCIATION BETWEEN THE PIM SERVICE AND AN ADDRESS OF THE VIRTUAL LOOPBACK INTERFACE — 504

RECEIVE, FROM THE SECOND NETWORK DEVICE VIA AN L3 TRANSPORT NETWORK, A UNICAST L3 PACKET COMPRISING A PIM REGISTER REQUEST DESTINED TO A RP DEVICE AND CONFIGURED TO REGISTER THE SECOND NETWORK DEVICE AS A MULTICAST SOURCE FOR A MULTICAST GROUP ASSOCIATED WITH THE MULTICAST SERVICE, WHEREIN A HEADER OF THE UNICAST L3 PACKET SPECIFIES A SOURCE ADDRESS COMPRISING THE ADDRESS OF THE VIRTUAL LOOPBACK INTERFACE OF THE FIRST NETWORK DEVICE — 506

REGISTER, BASED AT LEAST IN PART ON THE ASSOCIATION BETWEEN THE PIM SERVICE AND THE ADDRESS OF THE VIRTUAL LOOPBACK INTERFACE OF THE FIRST NETWORK DEVICE SPECIFIED BY THE HEADER OF THE UNICAST L3 PACKET, THE SECOND NETWORK DEVICE AS THE MULTICAST SOURCE FOR THE MULTICAST GROUP ASSOCIATED WITH THE MULTICAST SERVICE — 508

FIG. 5

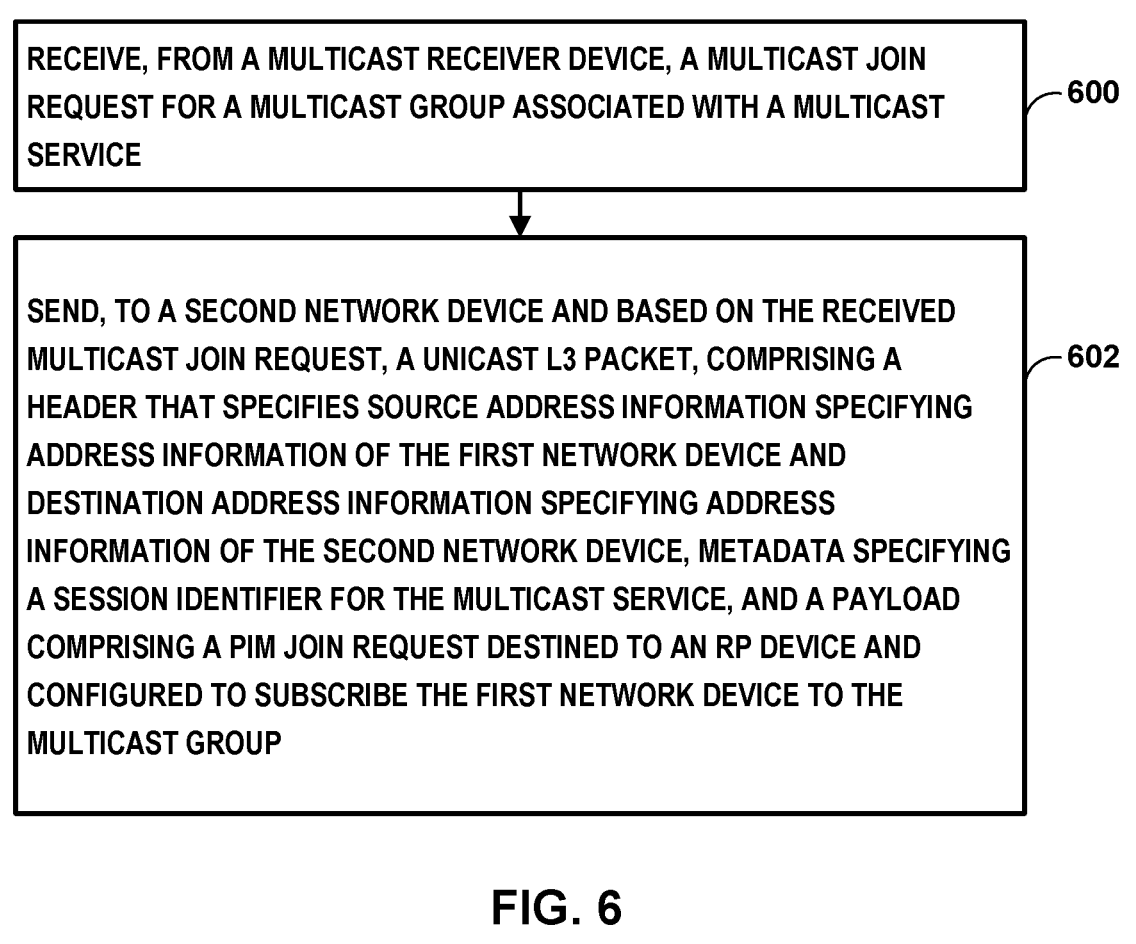

RECEIVE, FROM A MULTICAST RECEIVER DEVICE, A MULTICAST JOIN REQUEST FOR A MULTICAST GROUP ASSOCIATED WITH A MULTICAST SERVICE ⌐600

SEND, TO A SECOND NETWORK DEVICE AND BASED ON THE RECEIVED MULTICAST JOIN REQUEST, A UNICAST L3 PACKET, COMPRISING A HEADER THAT SPECIFIES SOURCE ADDRESS INFORMATION SPECIFYING ADDRESS INFORMATION OF THE FIRST NETWORK DEVICE AND DESTINATION ADDRESS INFORMATION SPECIFYING ADDRESS INFORMATION OF THE SECOND NETWORK DEVICE, METADATA SPECIFYING A SESSION IDENTIFIER FOR THE MULTICAST SERVICE, AND A PAYLOAD COMPRISING A PIM JOIN REQUEST DESTINED TO AN RP DEVICE AND CONFIGURED TO SUBSCRIBE THE FIRST NETWORK DEVICE TO THE MULTICAST GROUP ⌐602

FIG. 6

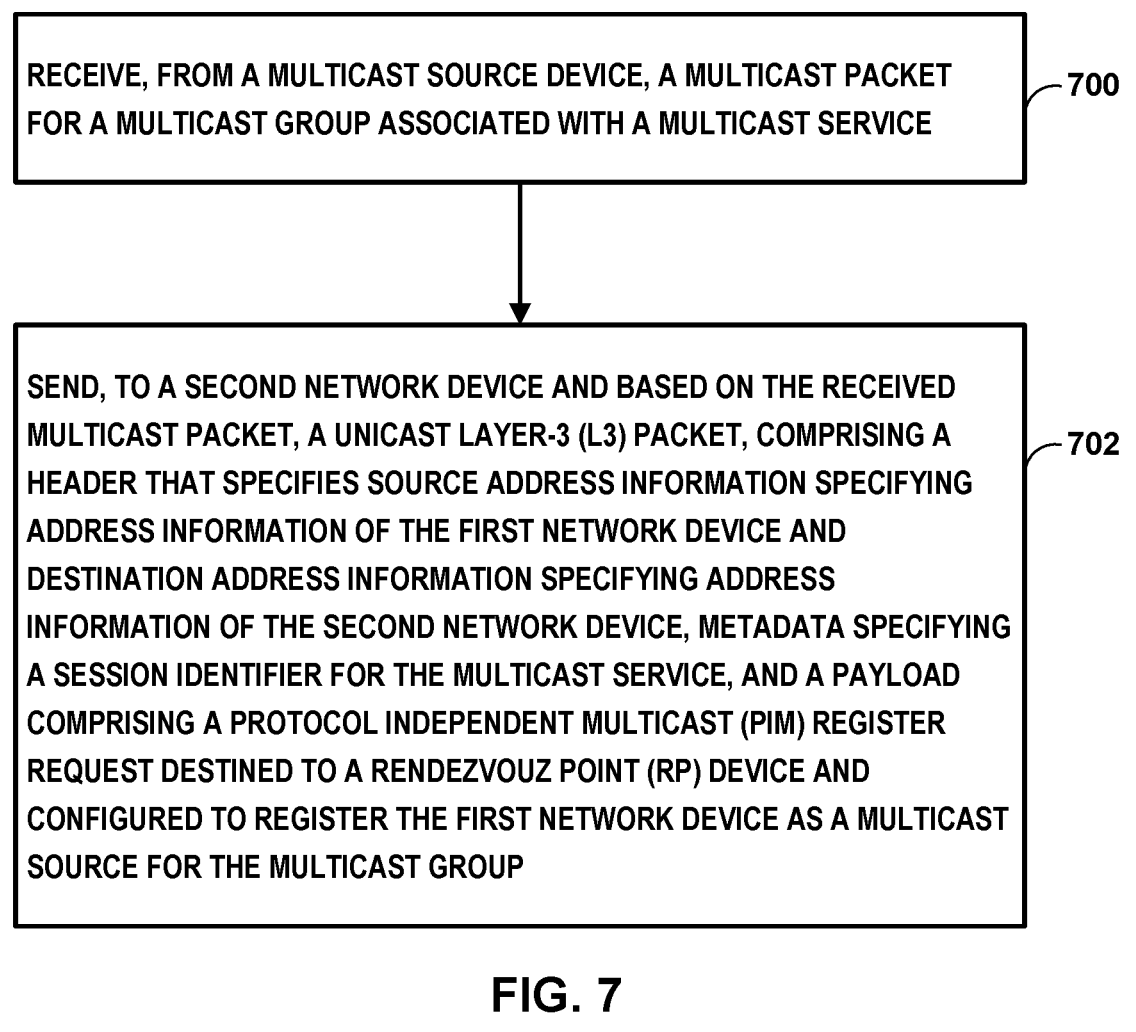

RECEIVE, FROM A MULTICAST SOURCE DEVICE, A MULTICAST PACKET FOR A MULTICAST GROUP ASSOCIATED WITH A MULTICAST SERVICE ⌐700

SEND, TO A SECOND NETWORK DEVICE AND BASED ON THE RECEIVED MULTICAST PACKET, A UNICAST LAYER-3 (L3) PACKET, COMPRISING A HEADER THAT SPECIFIES SOURCE ADDRESS INFORMATION SPECIFYING ADDRESS INFORMATION OF THE FIRST NETWORK DEVICE AND DESTINATION ADDRESS INFORMATION SPECIFYING ADDRESS INFORMATION OF THE SECOND NETWORK DEVICE, METADATA SPECIFYING A SESSION IDENTIFIER FOR THE MULTICAST SERVICE, AND A PAYLOAD COMPRISING A PROTOCOL INDEPENDENT MULTICAST (PIM) REGISTER REQUEST DESTINED TO A RENDEZVOUZ POINT (RP) DEVICE AND CONFIGURED TO REGISTER THE FIRST NETWORK DEVICE AS A MULTICAST SOURCE FOR THE MULTICAST GROUP ⌐702

FIG. 7

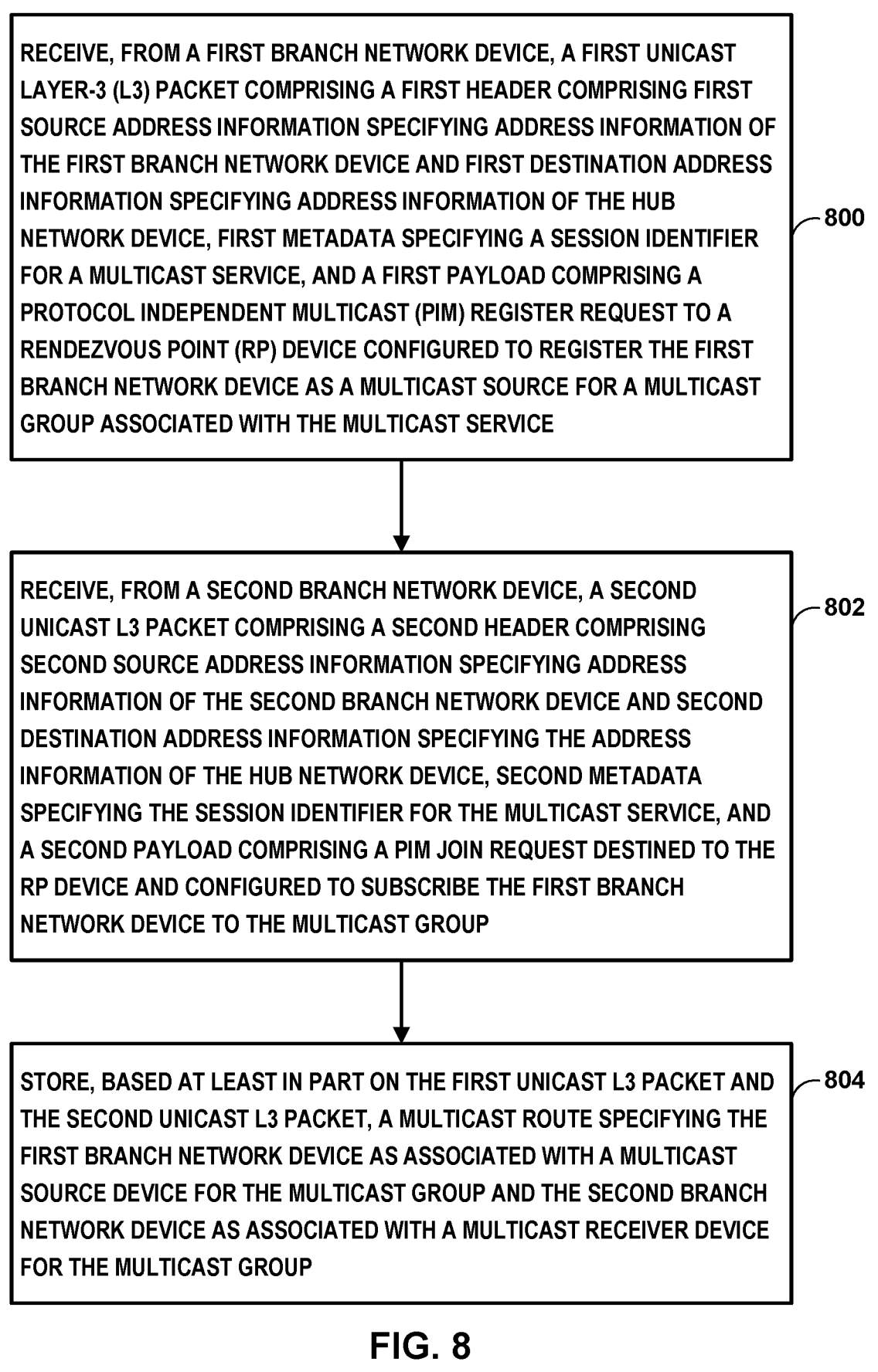

RECEIVE, FROM A FIRST BRANCH NETWORK DEVICE, A FIRST UNICAST LAYER-3 (L3) PACKET COMPRISING A FIRST HEADER COMPRISING FIRST SOURCE ADDRESS INFORMATION SPECIFYING ADDRESS INFORMATION OF THE FIRST BRANCH NETWORK DEVICE AND FIRST DESTINATION ADDRESS INFORMATION SPECIFYING ADDRESS INFORMATION OF THE HUB NETWORK DEVICE, FIRST METADATA SPECIFYING A SESSION IDENTIFIER FOR A MULTICAST SERVICE, AND A FIRST PAYLOAD COMPRISING A PROTOCOL INDEPENDENT MULTICAST (PIM) REGISTER REQUEST TO A RENDEZVOUS POINT (RP) DEVICE CONFIGURED TO REGISTER THE FIRST BRANCH NETWORK DEVICE AS A MULTICAST SOURCE FOR A MULTICAST GROUP ASSOCIATED WITH THE MULTICAST SERVICE — 800

RECEIVE, FROM A SECOND BRANCH NETWORK DEVICE, A SECOND UNICAST L3 PACKET COMPRISING A SECOND HEADER COMPRISING SECOND SOURCE ADDRESS INFORMATION SPECIFYING ADDRESS INFORMATION OF THE SECOND BRANCH NETWORK DEVICE AND SECOND DESTINATION ADDRESS INFORMATION SPECIFYING THE ADDRESS INFORMATION OF THE HUB NETWORK DEVICE, SECOND METADATA SPECIFYING THE SESSION IDENTIFIER FOR THE MULTICAST SERVICE, AND A SECOND PAYLOAD COMPRISING A PIM JOIN REQUEST DESTINED TO THE RP DEVICE AND CONFIGURED TO SUBSCRIBE THE FIRST BRANCH NETWORK DEVICE TO THE MULTICAST GROUP — 802

STORE, BASED AT LEAST IN PART ON THE FIRST UNICAST L3 PACKET AND THE SECOND UNICAST L3 PACKET, A MULTICAST ROUTE SPECIFYING THE FIRST BRANCH NETWORK DEVICE AS ASSOCIATED WITH A MULTICAST SOURCE DEVICE FOR THE MULTICAST GROUP AND THE SECOND BRANCH NETWORK DEVICE AS ASSOCIATED WITH A MULTICAST RECEIVER DEVICE FOR THE MULTICAST GROUP — 804

FIG. 8

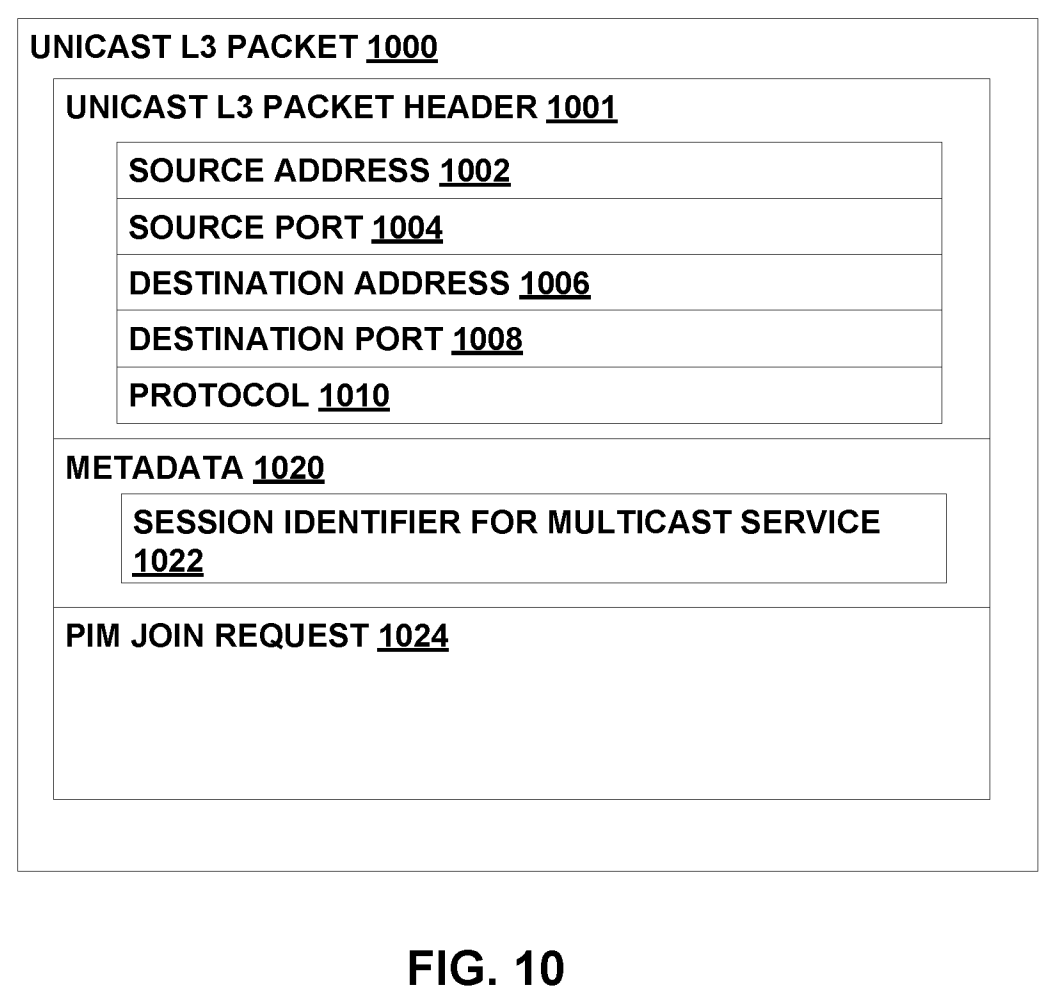

UNICAST L3 PACKET 1000

UNICAST L3 PACKET HEADER 1001

SOURCE ADDRESS 1002

SOURCE PORT 1004

DESTINATION ADDRESS 1006

DESTINATION PORT 1008

PROTOCOL 1010

METADATA 1020

SESSION IDENTIFIER FOR MULTICAST SERVICE 1022

PIM JOIN REQUEST 1024

FIG. 10

PROTOCOL INDEPENDENT MULTICAST (PIM) ACROSS TRANSPORT NETWORK

This application claims the benefit of U.S. Provisional Application No. 63/510,771, filed Jun. 28, 2023, the entire content of which is incorporated herein by reference.

TECHNICAL FIELD

This disclosure generally relates to computer networking, and, more specifically, to multicast communication.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the values specified in the source address and source port of the forward packet flow is the same values as specified in the destination address and destination port of the reverse packet flow, and the values specified in the destination address and destination port of the forward packet flow is the same values as specified in the source address and source port of the reverse packet flow.

Alternatively, a session may be unidirectional in that the session includes packets traveling in only one direction from a first device to a second device. For example, a session includes a forward packet flow originating from a first device and destinated for a second device. A different session may include a reverse packet flow originating from the second device and destined for the first device.

To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In general, the techniques disclosed herein are directed to the sending of Protocol Independent Multicast (PIM) messages across an L3 transport network. In one example, a first network device is connected to a multicast sender device via a Layer-2 (L2) network. The first network device is further connected to a second network device via an L3 transport network. The L3 transport network may be, e.g., a session-based routing transport network or a Multiprotocol Label Switching (MPLS) transport network.

The second network device defines a PIM service between the first network device and the second network device for a multicast service. The second network device establishes a virtual loopback interface and stores an association between the PIM service and an address of the virtual loopback interface. The first network device learns, via a routing protocol such as Border Gateway Protocol (BGP), the address of the virtual loopback interface of the second network device associated with the PIM service between the first and second network devices for the multicast service.

The first network device receives, from the multicast sender device via the L2 network, a multicast packet for a multicast group associated with the multicast service. The first network device generates, based at least in part on the multicast packet, a unicast L3 packet comprising a PIM register request destined to a Rendezvous Point (RP) device and configured to register the first network device as a multicast source for the multicast group. The header of the unicast L3 packet specifies a source address comprising a network address translation (NAT) to the address of the virtual loopback interface of the second network device. In some examples, the first network device performs a NAT of an address of the multicast sender device to the address of the virtual loopback interface of the second network device. In some examples, the first network device performs a NAT of an address of the first network device to the address of the virtual loopback interface of the second network device. The first network device forwards the unicast L3 packet to the second network device across the L3 transport network.

The second network device receives the unicast L3 packet. The second network device determines, based at least in part on the stored association between the PIM service and the address of the virtual loopback interface of the second network device, that the PIM register request is associated with the multicast group associated with the multicast service. The second network device registers the first network device as a multicast source for the multicast group associated with the multicast service.

The techniques of the disclosure may provide specific improvements to the computer-related field of computer networking that have practical applications. For example, conventionally, a network device receiving a PIM message from another network device interconnected via an L3 transport network may be unable to identify a multicast service or a multicast sender for which the PIM message is intended, because, where the network device supports multiple multicast services, a conventional PIM message may not include information specifying the corresponding multicast service from other multicast services to which the PIM message applies. This may force the network device to apply the same policies (e.g., Rendezvous Point, distribution tree, etc.) to multicast traffic of each of the different multicast services, where it may be more desirable apply different policies to different multicast services. The techniques of the disclosure may enable network devices to exchange PIM messages across an intermediate transport network while preserving the ability to identify the specific multicast senders, multicast receivers, and multicast services associated with particular PIM messages.

In addition, conventionally, an ingress network device of a transport network may receive multicast packets for a multicast group and forward the multicast packets across the transport network to an egress network device, which may discard the multicast packets if multicast receiver devices to which the egress network device is connected are not subscribed to the multicast group, thereby wasting network resources of the transport network. By facilitating the exchange of PIM messages between network devices inter-connected by a transport network, the techniques of the disclosure may reduce or eliminate a number of multicast packets for a multicast group that are sent across the transport network to an egress network device which is not connected to multicast receiver devices subscribed to the multicast group, thereby reducing the unnecessary consumption of network resources of the transport network, conserving processing power by the egress network device by virtue of it receiving fewer multicast packets, and increasing efficiency.

In one example, this disclosure describes a first network system comprising: storage media; and processing circuitry in communication with the storage media, the processing circuitry configured to: define PIM services between the first network device and a second network device, each of the PIM services associated with a respective multicast service of a plurality of multicast services; establish virtual loop-back interfaces of the first network device, each of the virtual loopback interfaces corresponding to a respective one of the PIM services; store an association between an address of each of the virtual loopback interfaces and the corresponding PIM service of the PIM services; receive, from the second network device via an L3 transport network, a unicast L3 packet comprising: a header specifying a source address that is the address of a first virtual loopback interface of the virtual loopback interfaces; and a payload comprising a PIM Register request destined to an RP device for a multicast group to register the second network device as a multicast source for the multicast group; and register, based at least in part on an association between the address of the first virtual loopback interface specified by the header of the unicast L3 packet and a first PIM service of the PIM services, the second network device as the multicast source for the multicast group, the multicast group associated with a first multicast service of the plurality of multicast services that is associated with the first PIM service.

In another example, this disclosure describes a method comprising: receiving, by a first network device and from a multicast sender device connected to the first network device via an L2 network, a multicast packet for a multicast group associated with a multicast service; generating, by the first network device and based at least in part on the multicast packet, a unicast L3 packet comprising a PIM Register request destined to a RP device and configured to register the first network device as a multicast source for the multicast group, wherein a header of the unicast L3 packet specifies a source address comprising a NAT to an address of a virtual loopback interface of a second network device, the virtual loopback interface associated with a PIM service between the first network device and the second network device for the multicast service, and forwarding, by the first network device, the unicast L3 packet across an L3 transport network to the second network device.

In another example, this disclosure describes non-transitory, computer-readable media including instructions that, when executed, are configured to cause processing circuitry of a first network device to: receive, from a multicast sender device connected to the first network device via an L2 network, a multicast packet for a multicast group associated with a multicast service; generate, based at least in part on the multicast packet, a unicast L3 packet comprising a PIM Register request destined to a RP device and configured to register the first network device as a multicast source for the multicast group, wherein a header of the unicast L3 packet specifies a source address comprising a network address translation (NAT) to an address of a virtual loopback interface of a second network device, the virtual loopback interface associated with a PIM service between the first network device and the second network device for the multicast service, and forward the unicast L3 packet across an L3 transport network to the second network device.

In another example, this disclosure describes a method comprising: defining, by a first network device, a PIM service between the first network device and a second network device for a multicast service; establishing, by the first network device, a virtual loopback interface; storing, by the first network device, an association between the PIM service and an address of the virtual loopback interface; receiving, by the first network device and from the second network device via an L3 transport network, a unicast L3 packet comprising a PIM Register request destined to a RP device and configured to register the second network device as a multicast source for a multicast group associated with the multicast service, wherein a header of the unicast L3 packet specifies a source address comprising the address of the virtual loopback interface of the first network device; and registering, by the first network device and based at least in part on the association between the PIM service and the address of the virtual loopback interface of the first network device specified by the header of the unicast L3 packet, the second network device as the multicast source for the multicast group associated with the multicast service.

In another example, this disclosure describes a first network system comprising: storage media; and processing circuitry in communication with the storage media, the processing circuitry configured to: receive, from a multicast sender device connected to the first network device via a L2 network, a multicast packet for a multicast group associated with a multicast service; generate, based at least in part on the multicast packet, a unicast L3 packet comprising: a header that specifies a source address that is an address of a virtual loopback interface of a second network device, the virtual loopback interface associated with a PIM service between the first network device and the second network device for the multicast service, and a payload containing a PIM Register request destined to a RP device for the multicast service to register the first network device as a multicast source for the multicast group; and forward the unicast L3 packet across an L3 transport network to the second network device.

In another example, this disclosure describes a method comprising: receiving, by a first network device and from a multicast receiver device, a multicast join request for a multicast group associated with a multicast service; and sending, by the first network device, based on the received multicast join request, and to a second network device, a unicast L3 packet comprising: a header comprising (1) source address information, the source address information specifying address information of the first network device, and (2) destination address information, the destination address information specifying address information of the second network device; metadata specifying a session identifier for the multicast service; and a payload comprising a PIM join request destined to a RP device and configured to subscribe the first network device to the multicast group.

In another example, this disclosure describes a method comprising: receiving, by a first network device and from a multicast source device, a multicast packet for a multicast group associated with a multicast service; and sending, by the first network device, based on the received multicast packet, and to a second network device, a unicast L3 packet comprising: a header comprising (1) source address information, the source address information specifying address information of the first network device, and (2) destination address information, the destination address information specifying address information of the second network device; metadata specifying a session identifier for the multicast service; and a payload comprising a PIM Register request destined to a RP device and configured to register the first network device as a multicast source for the multicast group.

In another example, this disclosure describes a method comprising: receiving, by a hub network device and from a first branch network device, a first unicast L3 packet comprising: a first header comprising (1) first source address information, the first source address information specifying address information of the first branch network device, and (2) first destination address information, the destination address information specifying address information of the hub network device; first metadata specifying a session identifier for a multicast service; and a first payload comprising a PIM Register request to a RP device configured to register the first branch network device as a multicast source for a multicast group associated with the multicast service; receiving, by the hub network device and from a second branch network device, a second unicast L3 packet comprising: a second header comprising (1) second source address information, the second source address information specifying address information of the second branch network device, and (2) second destination address information, the second destination address information specifying the address information of the hub network device; second metadata specifying the session identifier for the multicast service; and a second payload comprising a PIM join request destined to the RP device and configured to subscribe the first branch network device to the multicast group; and storing, by the hub network device and based at least in part on the first unicast L3 packet and the second unicast L3 packet, a multicast route specifying the first branch network device as associated with a multicast source device for the multicast group and the second branch network device as associated with a multicast receiver device for the multicast group.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 4 is a flowchart illustrating an example operation in accordance with the techniques of the disclosure.

FIG. 5 is a flowchart illustrating an example operation in accordance with the techniques of the disclosure.

FIG. 6 is a flowchart illustrating an example operation in accordance with the techniques of the disclosure.

FIG. 7 is a flowchart illustrating an example operation in accordance with the techniques of the disclosure.

FIG. 8 is a flowchart illustrating an example operation in accordance with the techniques of the disclosure.

FIG. 10 is a block diagram illustrating an example unicast L3 packet encapsulating a PIM join request in accordance with the techniques of the disclosure.

Like reference characters refer to like elements throughout the figures and description.

DETAILED DESCRIPTION

Figure 1:
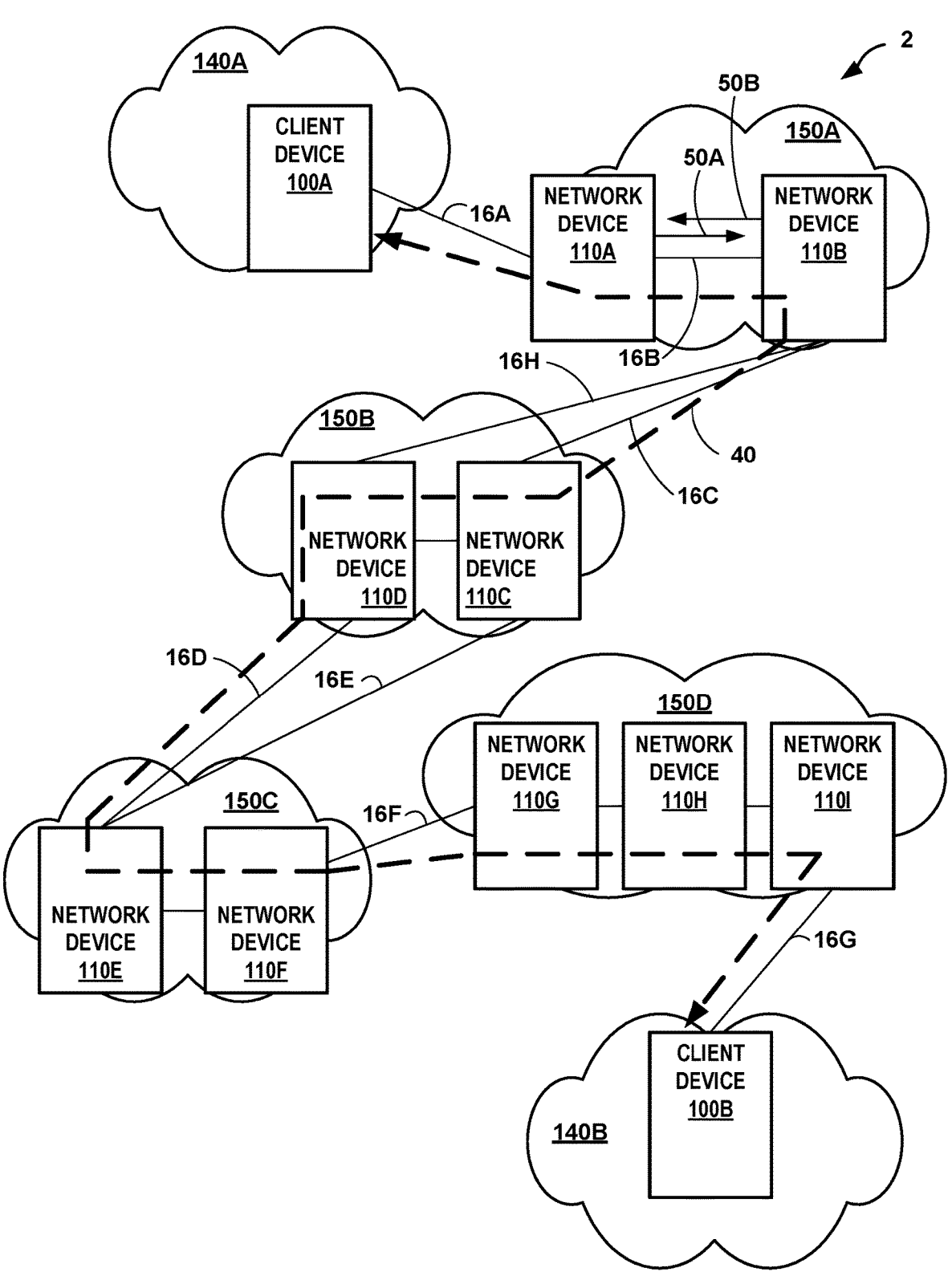
FIG. 1 is a block diagram illustrating an example computer network system in accordance with the techniques of the disclosure.

FIG. 1 is a block diagram illustrating an example computer network system 2 in accordance with the techniques of the disclosure. In the example of FIG. 1, computer network system 2 includes one or more service provider networks, e.g., service provider networks 150A-150D (collectively, "service provider networks 150") configured to provide Wide Area Network (WAN) connectivity to disparate customer networks 140A-140B (collectively, "customer networks 140"). Network devices 110A-110I (collectively, "network devices 110") of service provider networks 150 provide client devices 100A-100B (collectively, "client devices 100") associated with customer networks 140 with access to service provider networks 150. In some examples, customer networks 140 are enterprise networks. Customer network 140A is depicted as having a single client device 100A and customer network 140B is depicted as having a single client device 100B for ease of illustration, but each of customer networks 140 may include any number of client devices.

In some examples, customer networks 140 may be L2 computer networks, where reference to a layer followed by a number refers to a corresponding layer in the Open Systems Interconnection (OSI) model. L2 is also known as a "data link layer" in the OSI model and the term L2 may be used interchangeably with the phrase "data link layer" throughout this disclosure. Typically, customer networks 140 include many client devices 100, each of which may communicate across service provider networks 150 with one another as described in more detail below. Communication links 16A-16H (collectively, links "16") may be Ethernet, ATM or any other suitable network connections. In other examples, customer networks 140 may be L3 networks. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Network devices 110 may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100, with access to the Internet, and may allow the computing devices within customer networks 140 to communicate with each other.

Although additional routers are not shown for ease of explanation, it should be understood that system 2 may include additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

In some examples, network devices 110 may implement a stateful, session-based routing scheme that enables each of network devices 110 to independently perform path selection and traffic engineering. The use of session-based routing may enable network devices 110 to eschew the use of a centralized controller, such as a Software-Defined Networking (SDN) controller to perform path selection and traffic engineering. In this way, network devices 110 may be more efficient and scalable for large networks where the use of an SDN controller would be infeasible. Furthermore, the use of session-based routing may enable network devices 110 to eschew the use of tunnels, thereby saving considerable network resources by obviating the need to perform encapsulation and decapsulation at tunnel endpoints. In some examples, network devices 110 implement session-based routing as Secure Vector Routing (SVR), provided by Juniper Networks, Inc. In some examples, network devices 110 include Ethernet over SVR (EoSVR) routers.

In the example of FIG. 1, client device 100A of system 2 establishes session 40 (shown with a dashed line) with client device 100B. Network devices 110 facilitate establishment of session 40 by transporting network traffic between client device 100A and client device 100B. In some examples, client device 100A may be considered a "source" device in that client device 100A originates session 40 between client device 100A and client device 100B, e.g., client device 100A is the "source" of a packet of a forward flow of the session. Session 40 includes a forward packet flow originating from client device 100A and destined for client device 100B and a reverse packet flow originating from client device 100B and destined for client device 100A. A forward flow for session 40 traverses a first path including, e.g., client device 100A, network devices 110A-110I, and client device 100B.

In some examples, network devices 110 may extend session 40 as an L3 session across service provider networks 150 according to one or more L3 communication session protocols, including Transmission Control Protocol (TCP) or User Datagram Protocol (UDP), etc. For example, to establish session 40 according to TCP such that data may be exchanged according to TCP, client device 100A and client device 100B perform a three-way handshake. Client device 100A sends a first packet having a "SYN" flag to client device 100B. Client device 100B acknowledges receipt of the first packet by responding to client device 100A with a second packet having a "SYN-ACK" flag. Client device 100A acknowledges receipt of the second packet by responding to client device 100B with a third packet including an "ACK" flag. After sending the third packet, session 40 is established according to TCP and client devices 100A, 100B may exchange data with one another via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that client device 100A does not verify that client device 100B is capable of receiving data prior to transmitting data. To establish session 40 according to UDP, client device 100A transmits a first packet to client device 100B. Session 40 may be considered "established" according to UDP upon receipt by client device 100A of any packet from client device 100B, which implies that client device 100B successfully received the first packet from client device 100A, responded, and client device 100A was able to receive the response from client device 100B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1, when network device 110A receives a packet for the forward packet flow originating from client device 100A and destined for client device 100B, network device 110A determines whether the packet belongs to a new session (e.g., is the "first" packet or "lead" packet of session 40). In some examples, network device 110A determines whether session information, e.g., a source address, source port, destination address, destination port, and protocol, of the first packet matches an entry in a session table.

If no such entry exists, network device 110A determines that the packet belongs to a new session and creates an entry in the session table. Furthermore, if the packet belongs to a new session, network device 110A may generate a session identifier for session 40. The session identifier may include, e.g., a source address and source port of client device 100A, a destination address and destination port of client device 100B, and a protocol used by the first packet. Network device 110A may use the session identifier to identify subsequent packets as belonging to the same session.

In some examples, network devices 110 perform stateful routing for session 40. For example, network devices 110 may forward each packet of the forward packet flow of session 40 sequentially and along the same forward network path. As described herein, the "same" forward path may mean the same network devices 110 that form a segment or at least a portion of the path between a device originating the packet and a device to which the packet is destined (and not necessarily the entire network path between the device originating the packet and the device to which the packet is destined). Further, network devices 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, network devices 110 maintain the state of the entire flow at each network device 110, thereby enabling the use of stateful packet services, such as Deep Packet Inspection (DPI).

In the example of FIG. 1, a stateful routing session may be established from network device 110A (which may be an ingress network device) through intermediary network devices, such as network devices 110B-110H, to network device 110I (which may be an egress network device). In this example, network device 110A determines that the first packet is an unmodified packet and the first packet of new session 40. Network device 110A modifies the first packet to include metadata specifying the session identifier. The metadata may, in some examples, be inserted after the header of the modified first packet. The session identifier may include, e.g., the original source address, source port, destination address, destination port, protocol, service, and/or tenant. Network device 110A replaces the header of the modified first packet to specify a source address that is an address of network device 110A, a source port that is a port via which network device 110A forwards the modified first packet toward client device 100B, a destination address that is an address of the next hop to which network device 110A forwards the first packet (e.g., an address of network device 110B), and a destination port that is a port of the next hop to which network device 110A forwards the first packet (e.g., a port of network device 110B).

Network device 110A may further identify a network service associated with session 40. For example, network device 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, network device 110A may determine that the forward packet flow of session 40 specifies a destination address and destination port assigned to client device 100B. Network device 110A may thereafter store an association between session 40 with the identified network service. As another example, if the source port and/or destination port for session 40 is 80, network device 110A may determine that session 40 is associated with an HTTP service. In other examples, network device 110A may determine that one or more of a source address, source port, destination address, or destination port for session 40 belong to a block of addresses or ports indicative that a particular service is associated with session 40.

In some examples, network device 110A uses the determined network service for session 40 to select a forward path for forwarding the first packet and each subsequent packet of the forward packet flow of session 40 toward client device 100B. In this fashion, network device 110A may perform service-specific path selection to select a network path that best suits the requirements of the service. In contrast to a network topology that uses an SDN controller to perform path selection, each of network devices 110 performs path selection. Further, the use of session-based routing enables each of network devices 110 to make routing decisions at the service- or application-level, in contrast to conventional network devices that are only able to make routing decisions at the flow level.

Additionally, network device 110A may store the session identifier for session 40 such that, upon receiving subsequent packets for session 40, network device 110A may identify the subsequent packets as belonging to the same session 40 and forward the subsequent packets along the same path as the first packet. In some examples, upon receiving such subsequent packets, network device 110A may forward the subsequent packets without the metadata specifying the session identifier.

Intermediary network device 110B receives the modified first packet from network device 110A. Network device 110B determines whether the modified first packet includes metadata specifying the session identifier. In response to determining that the modified first packet includes metadata specifying the session identifier, intermediary network device 110B determines that network device 110B is not an ingress device such that network device 110B does not attach metadata specifying the session identifier.

As described above with respect to network device 110A, network device 110B determines whether the packet belongs to a new session (e.g., is the "first" packet or "lead" packet of the session) by determining whether a source address, source port, destination address, destination port, and protocol of the first packet matches an entry in a session table. If no such entry exists, network device 110B may determine that the packet belongs to a new session and create an entry in the session table. Furthermore, if the packet belongs to a new session, network device 110B may generate a session identifier for the session. The session identifier used by network device 110B to identify the session for the first packet may be different from the session identifier used by network device 110A to identify the same session for the first packet, because each network device 110A, 110B uses the header source address, source port, destination address, and destination port of the first packet to generate the session identifier, and this header information may be modified by each preceding network device of network devices 110 as each of network devices 110 forwards the first packet along the forward path. Furthermore, each of network devices 110 may store this header information to identify a previous network device of network devices 110 (or "waypoint") and a next network device of network devices 110 (or "waypoint") such that each of network devices 110 may reconstruct the same forward path and reverse path for each subsequent packet of the session.

Network device 110B may replace the header of the modified first packet to specify a source address that is an address of network device 110B, a source port that is a port via which network device 110B forwards the modified first packet toward client device 100B, a destination address that is an address of the next hop to which network device 110B may forward the first packet (e.g., an address of network device 110C for session 40 along the first path), and a destination port that is a port of the next hop to which network device 110B may forward the first packet (e.g., a port of network device 110C). Network device 110B forwards the modified first packet to network device 110C. Additionally, network device 110B may store the session identifier for the session such that, upon receiving subsequent packets for the session, network device 110B may identify subsequent packets as belonging to the same session and forward the subsequent packets along the same path as the first packet.

Subsequent intermediary network devices, such as network devices 110C-110H, may process the modified first packet in a similar fashion as network devices 110A and 110B such that network devices 110 forward the subsequent packets of the session along the same path as the first packet. Further, each of network devices 110 may store a session identifier for the session, which may include an identification of the previous network device of network devices 110 along the network path. Thus, each of network devices 110 may use the session identifier to forward packets of the reverse packet flow for the session along the same network path back to client device 100A.

A network device of network devices 110 that may forward packets for a forward packet flow of the session to a destination for the packet flow may be called an egress, or "terminus" network device. In the foregoing example, network device 110I is a terminus network device because network device 110I may forward packets to client device 100B. Network device 110I receives the modified first packet that includes the metadata specifying the session identifier (e.g., the original source address, source port, destination address, and destination port). Network device 110I determines the modified first packet is destined for a service terminating at network device 110I by determining that the destination source address and destination source port specified in the metadata of the modified lead packet corresponds to a destination reachable by network device 110I (e.g., client device 100B). Network device 110I recovers the original first packet by removing the metadata from the modified first packet and using the metadata to modify the header of the first packet to specify the original source address and source port of client device 100A and destination address and destination port of client device 100B. Network device 110I forwards the recovered first packet to client device 100B. The use of session-based routing may therefore form a series of waypoints (e.g., network devices 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; "Secure Vector Routing (SVR)," draft-menon-svr-00, Internet-Draft, Internet Engineering Task Force (IETF), Oct. 1, 2021, available at https://datatracker.ietforg/doc/draft-menon-svr/00/; "Secure Vector Routing (SVR)," draft-menon-svr-01, Internet-Draft, Internet Engineering Task Force (IETF), Mar. 29, 2022, available at https://datatracker.ietforg/doc/draft-menon-svr/01/; and "Secure Vector Routing (SVR)," draft-menon-svr-02, Internet-Draft, Internet Engineering Task Force (IETF), Sep. 20, 2022, available at https://datatracker.ietf org/doc/draft-menon-svr/02/; the entire contents of each of which is incorporated by reference herein.

Bidirectional Forwarding Detection (BFD) is a network protocol that is used to detect faults in a bidirectional path between two network devices, such as link 16B between network devices 110A and 110B. BFD provides low-overhead, short-duration detection of failures in the link between the two network devices. Further, BFD provides a single mechanism that can be used for liveness detection over any media, at any protocol layer, with a wide range of detection times and overhead, to avoid a proliferation of different methods between adjacent devices. BFD operates on top of any data protocol (network layer, link layer, tunnels, etc.) being forwarded between two network devices. Typically, BFD operates in a unicast, point-to-point mode. BFD packets are carried as a payload of whatever encapsulating protocol is appropriate for the medium and network.

In accordance with BFD, network devices 110A and 110B establish a session over link 16B. Typically, network devices 110A and 110B establish and tear down a BFD session with a three-way handshake. Typically, network devices 110A and 110B may declare link 16B to be operational only after two-way communication is established between network devices 110A and 110B. However, this does not preclude the use of unidirectional links. For example, link 16B may represent a first unidirectional link from network device 110A to network device 110B, and a second unidirectional link from network device 110B to network device 110A.

Once the BFD session is established, network devices 110A and 110B transmit BFD packets periodically over link 16B. Each network device 110A, 110B estimates how quickly it may send and receive BFD packets so as to negotiate, with the peer network device 110A, 110B how rapidly failure detection may occur. In some examples, network devices 110A and 110B may modify, in real-time, these estimates to adapt to network congestion, changes in latency or bandwidth, or other unusual situations. This may allow for the use of a shared medium between fast network devices and slow network devices, while allowing the fast network devices to more rapidly detect failures while allowing the slow network devices to participate in failure detection.

BFD may operate in two modes: asynchronous mode and demand mode. In asynchronous mode, if one of network devices 110A and 110B stop receiving BFD packets for some amount of time (the length of which is negotiated as described above), network devices 110A and 110B may assume that link 16B (or a component, device, or path forming link 16B) has failed. In demand mode, network devices 110A and 110B may negotiate not to send periodic BFD packets in order to reduce overhead. This assumes that network devices 110A and 110B have another way to verify connectivity to one another, such as via the physical layer. However, either network device 110A, 110B may still send BFD packets if needed.

Additionally, either network device 110A, 110B may use an Echo function. When this function is active, network device 110A, e.g., sends a stream of Echo packets to network device 110B. Network device 110B responds by transmitting the Echo packets back to network device 110A via the forwarding plane of network device 110B. Network device 110A may use the Echo function to test the forwarding path to network device 110B, and vice versa. Additional example information regarding BFD is described in "Bidirectional Forwarding Detection (BFD)," RFC 5880, IETF, June 2010, available at https://datatracker.ietforg/doc/html/rfc5880; and "Bidirectional Forwarding Detection (BFD) for IPv4 and IPv6 (Single Hop)," RFC 5881, IETF, June 2010, available at https://datatracker.ietf.org/doc/rfc5881/, the entire contents of each of which are incorporated herein by reference.

Network devices 110 create a separate BFD session for each communications path and data protocol in use between two network devices. For example, to perform fault detection along the entire path of session 40 between network device 110A and 110I, a distinct BFD session may be established along each link 16, e.g., such as a first BFD session between network devices 110A and 110B along a first link, a second BFD session between network devices 110B and 110C along link 16C, etc.

In some examples, the use of a dedicated BFD session between two network devices may be infeasible. For example, a hub network device may be connected to a large number of spoke network devices (e.g., dozens, hundreds, or more network devices). If such a hub network device were to maintain a dedicated BFD session with each spoke network device to which the hub network device is connected, BFD packets sent and received by the hub network device may consume a large amount of network resources. Accordingly, the use of dedicated BFD sessions may consume network resources that could otherwise be used for sending and receiving customer traffic.

In some examples, to reduce the consumption of network resources used for performance monitoring, network devices 110 may use in-flow performance monitoring. For example, each network device 110 may modify packets carrying customer data for a session between client devices 100 to include metadata including performance information. For example, a session between client device 100A and client device 100B is made up of a forward flow originating from client device 100A and destined for client device 100B and a reverse flow originating from client device 100B and destined for client device 100A. Network device 110A receives, from client device 100A, a first packet of the forward flow, the first packet including a header and a data payload. Network device 110A modifies the first packet to further include metadata including first performance information and forwards the modified first packet to network device 110B. Network device 110B may obtain the first performance information from the metadata of the first packet. Further, network device 110B may remove the metadata and forward the first packet toward client device 100B (e.g., by forwarding the packet to network device 110C).

Additionally, network device 110B receives, from client device 100B, a second packet of the reverse flow, the second packet including a header and a data payload. Network device 110B modifies the second packet to further include metadata including second performance information and forwards the modified second packet to network device 110A. Network device 110A may obtain the second performance information from the metadata of the second packet. Further, network device 110A may remove the metadata and forward the second packet toward client device 100A.

In some examples, the metadata includes a BFD packet. In some examples, the metadata includes a timestamp that network devices 110A, 110B may use to determine performance information. In some examples, the metadata includes a measure of network performance, such as a measure of latency, jitter, packet loss, bandwidth, etc. For example, network device 110A modifies a first packet of a forward flow to include metadata specifying a first timestamp indicative of a time at which network device 110A forwards the first packet toward network device 110B. Network device 110B modifies a second packet of a reverse flow to include metadata specifying a second timestamp indicative of a time at which network device 110B received the first packet from network device 110A and/or a third timestamp indicative of a time at which network device 110B forwards the second packet toward network device 110A. Network device 110A and 110B may exchange a plurality of such modified packets to obtain multiple datapoints regarding the performance of link 16B between network device 110A and 110B. Network device 110A, for example, may process the multiple timestamps to generate metrics for link 16B between network device 110A and 110B, such as latency, jitter, packet loss, bandwidth, etc. In this fashion, network devices 110A and 110B may conduct performance monitoring of link 16B without interrupting customer traffic between client devices 100 or consuming additional network resources through the use of dedicated BFD sessions for performance monitoring.

PIM is a family of routing protocols that are used to facilitate the distribution of multicast traffic over a large network, such as a LAN, WAN, or the Internet. PIM is protocol-independent in that PIM may use routing information supplied by other routing protocols, such as BGP. PIM may operate in Sparse Mode or Dense Mode. A network device employing PIM Dense Mode floods multicast traffic to each other peer network device, and therefore PIM Dense Mode does not scale well due to the volume of traffic of large networks.

A network device employing PIM Sparse-Mode may determine an optimal RP between a multicast sender device and a multicast receiver device, and create a shortest-path tree for distribution of multicast messages. PIM Sparse-Mode scales more effectively for large networks. When a multicast source device sends one or more multicast packet to a multicast group, a designated router (DR) for the multicast source device sends a unicast PIM Register request to the RP encapsulating the one or more multicast packets. The RP registers the DR for the multicast source device as a multicast source for the multicast group.

A multicast receiver device indicates a desire to join a multicast group by sending a join request, such as an Internet Group Management Protocol (IGMP) group join request, to a DR for the multicast receiver device. The DR for the multicast receiver device sends a PIM join request to the RP, which in turn registers the DR for the multicast receiver device as a multicast receiver for the multicast group. Periodically, the DR for the multicast source device, the DR for the multicast receiver device, the RP, or another intermediary network device may transmit PIM prune messages to remove network devices not connected to multicast receiver devices from the distribution tree.

Additional example information regarding PIM and PIM Sparse-Mode is described in "Protocol Independent Multicast-Sparse Mode (PIM-SM): Protocol Specification," Request for Comments (RFC) 2117, Internet Engineering Task Force (IETF), June 1998, available at https://www.ietforg/rfc/rfc2362.txt, the entire contents of which are incorporated herein by reference.

In accordance with the techniques of the disclosure, network devices 110 exchange PIM messages across an L3 transport network, such as one or more service provider networks 150. In one example, network device 110A is connected to client 100A via an L2 network, such as customer network 140A. Client device 100A operates as a multicast sender device for a multicast group associated with a multicast service. Network device 110A is further connected to network device 110B via an L3 transport network, such a service provider network 150A. Service provider network 150A may be, e.g., a session-based transport network or an MPLS transport network.

Network device 110B defines a PIM service between network device 110A and network device 110B for the multicast service. In the example of FIG. 1, network device 110A and network device 110B may or may not be directly connected. For example, one or more intermediate network devices (not depicted in the example of FIG. 1) of service provider network 150A may provide connectivity between network devices 110A and 110B.

Network device 110B establishes a virtual loopback interface and stores an association between the PIM service and an address of the virtual loopback interface. Network device 110A learns, via a routing protocol such as BGP, the address of the virtual loopback interface of Network device 110B associated with the PIM service between network devices 110A, 110B for the multicast service. In some examples, the address of the virtual loopback interface of network device 110B is used as a service identifier for the PIM service between network devices 110A, 110B for the multicast service.

Network device 110A receives, from the multicast sender device 100A via the L2 network 140A, a multicast packet for the multicast group associated with the multicast service. Network device 110A generates, based at least in part on the multicast packet, a unicast L3 packet including a PIM register request destined to a RP device and configured to register network device 110A as a multicast source for the multicast group. The header of the unicast L3 packet specifies a source address that is a network address translation (NAT) of the address of the virtual loopback interface of network device 110B. In some examples, network device 110A performs a NAT of an address of the multicast sender device to the address of the virtual loopback interface of network device 110B. In some examples, network device 110A performs a NAT of an address of network device 110A to the address of the virtual loopback interface of network device 110B. Network device 110A forwards the unicast L3 packet to network device 110B across the L3 transport network 150A.

Network device 110B receives the unicast L3 packet. Network device 110B determines, based at least in part on the stored association between the PIM service and the address of the virtual loopback interface of network device 110B, that the PIM register request is associated with the multicast group associated with the multicast service. Network device 110B registers network device 110A as a multicast source for the multicast group associated with the multicast service.

In some examples service provider network 150A is a session-based routing transport network, as described above. In this example, network device 110A performs session-based routing to forward the unicast L3 packet to network device 110B. For example, network device 110A modifies the header of the unicast L3 packet to specify an address of the network device 110A as the source address and an address of network device 110B as a destination address. Further, network device 110A adds, to the unicast L3 packet, metadata specifying the address of the virtual loopback interface of network device 110B. Upon receipt of the unicast L3 packet, network device 110B may modify, based at least in part on the metadata, the header of the unicast L3 packet to specify the address of the virtual loopback interface of the second network device as the source address of the unicast L3 packet and remove, from the unicast L3 packet, the metadata.

Additional information with respect to the use of PIM and session-based routing is discussed in U.S. Pat. No. 11,005,749, entitled "Multicast source and receiver access control,"

issued on May 11, 2021 and U.S. Pat. No. 11,070,465, entitled "Distribution of multicast information in a routing system," issued on Jul. 20, 2021, the entire contents of each of which are incorporated herein by reference.

In some examples service provider network 150A is an MPLS transport network, as described above. In such an example, network device 110A forwards the unicast L3 packet across the MPLS transport network by encapsulating the unicast L3 packet with one or more MPLS labels. Upon receipt if the unicast L3 packet, network device 110B removes, from the unicast L3 packet, the one or more MPLS labels.

The foregoing example involved the sending of a PIM register request across a transport network responsive to the receipt by network device 110A of a multicast packet by client device 100A, operating as a multicast source device. However, the techniques of the disclosure may equally by applied to any type of PIM message to be forwarded across a transport network, such as PIM join requests or PIM prune requests.

For example, network device 110I receives an IGMP group join request for the multicast group from client device 100B, operating as a multicast receiver device. Network device 110I generates a unicast L3 packet containing a PIM join request to register network device 110I as a multicast receiver for the multicast group, the unicast L3 packet further including a header specifying a source address that is an address of a virtual loopback interface of network device 110H, wherein the virtual loopback interface of network device 110H is associated with a PIM service between network device 110H and network device 110I for the multicast service associated with the multicast group. Network device 110I forwards the unicast L3 packet including the PIM join request to Network device 110H. Network device 110H may register network device 110I as a multicast receiver for the multicast group based at least in part on the virtual loopback interface of network device 110H specified by the unicast L3 packet. Further, network device 110H may forward the PIM join request toward an RP for the multicast service using similar techniques.

As another example, network device 110I may forward a unicast L3 packet containing a PIM prune message and further specifying a source address that is the address of the virtual loopback interface of network device 110H, wherein the virtual loopback interface of network device 110H is associated with a PIM service between network device 110H and network device 110I for the multicast service associated with the multicast group. Network device 110H may perform a prune of one or more network devices in accordance with the PIM prune message as well as forward the PIM prune message toward an RP for the multicast service using similar techniques.

Figure 2:
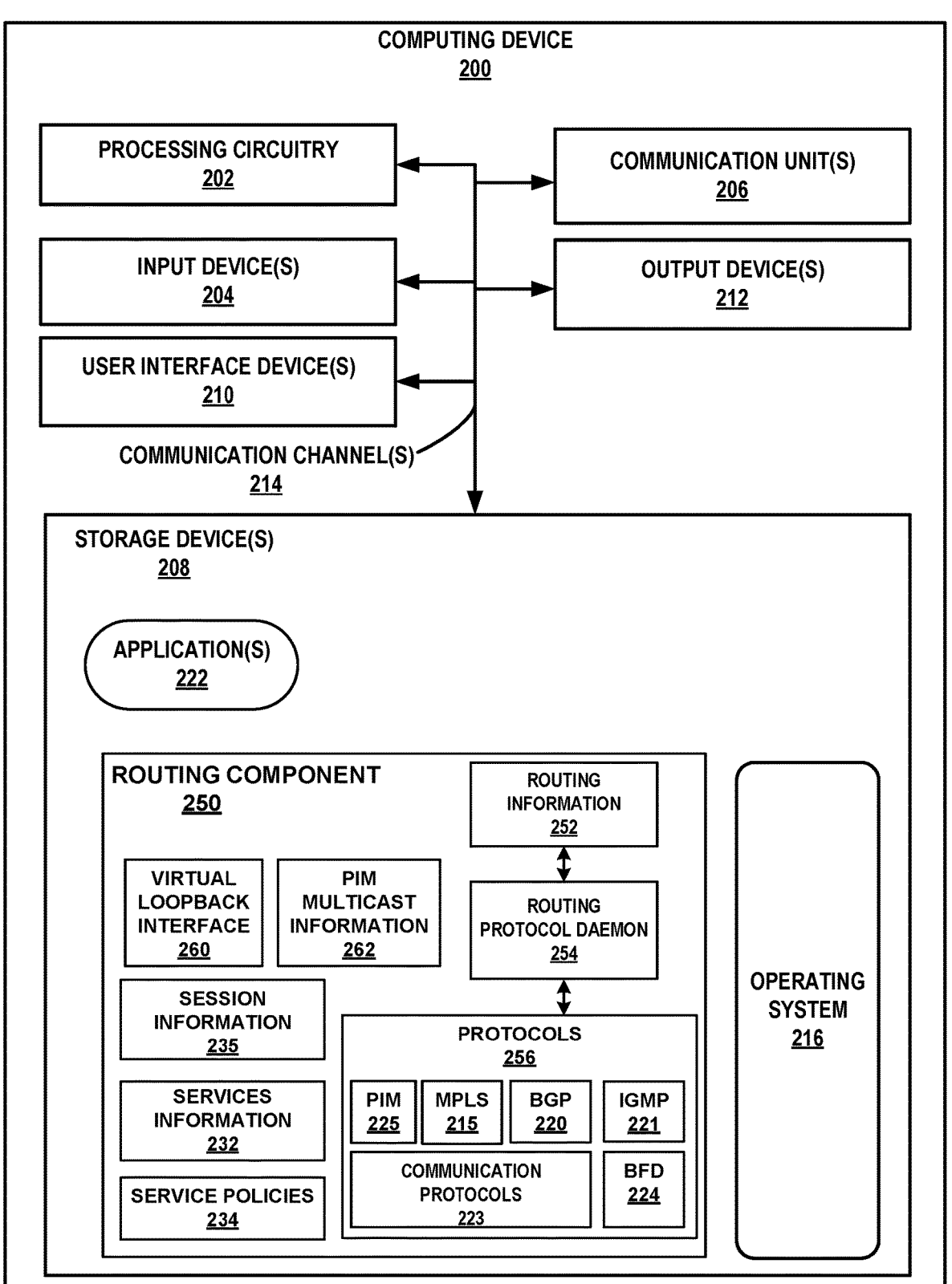
FIG. 2 is a block diagram illustrating an example computing device in accordance with the techniques of the disclosure.

FIG. 2 is a block diagram illustrating an example computing device 200 in accordance with the techniques of the disclosure. In general, computing device 200 may be an example implementation of one of network devices 110 of FIG. 1. Computing device 200 includes processing circuitry 202 for executing any one or more of applications 222, routing component 250, or any other computing device described herein. Other examples of computing device 200 may be used in other instances to implement the techniques of the disclosure. While illustrated as a single device in the example of FIG. 2, in some examples, computing device 200 may be implemented as a computing system distributed across multiple devices, e.g., such as in a distributed computing or cloud computing environment.

Although shown in FIG. 2 as a stand-alone computing device 200 for purposes of example, a computing device that operates in accordance with the techniques of this disclosure may be any component or system that includes one or more processors or other suitable computing environment for executing software instructions and, for example, need not necessarily include one or more elements shown in FIG. 2 (e.g., communication units 206; and in some examples, components such as storage device(s) 208 may not be co-located or in the same chassis as other components). In some examples, computing device 200 may be implemented as a virtualized network function (VNF). In some examples, one or more aspects of computing device 200 can be run as one or more containers or as one or more applications within virtual machines of a Network Functions Virtualization (NFV) platform using, e.g., virtual input and output (VirtIO) and single root input/output virtualization (SR-IOV) network virtualization technologies, or on bare-metal servers. In some examples, computing device 200 is a physical network device, such as a switch, router, gateway, or other device that sends and receives network traffic.

As shown in the example of FIG. 2, computing device 200 includes processing circuitry 202, one or more input device(s) 204, one or more communication unit(s) 206, one or more output device(s) 212, one or more storage device(s) 208, and one or more user interface (UI) device(s) 210. Computing device 200, in one example, further includes one or more application(s) 222 and operating system 216 that are executable by computing device 200. Each of components 202, 204, 206, 208, 210, and 212 are coupled (physically, communicatively, and/or operatively) for inter-component communications. In some examples, communication channel(s) 214 may include a system bus, a network connection, an inter-process communication data structure, or any other method for communicating data. As one example, components 202, 204, 206, 208, 210, and 212 may be coupled by one or more communication channels 214.

Processing circuitry 202, in one example, is configured to implement functionality and/or process instructions for execution within computing device 200. In some examples, processing circuitry 202 includes one or more hardware-based processors. For example, processing circuitry 202 may be capable of processing instructions stored in storage device 208. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage device(s) 208 may be configured to store information within computing device 200 during operation. Storage device(s) 208, in some examples, is described as a computer-readable storage medium. In some examples, storage device(s) 208 include a temporary memory, meaning that a primary purpose of storage device 208 is not long-term storage. Storage device(s) 208, in some examples, include a volatile memory, meaning that storage device(s) 208 does not maintain stored contents when the computer is turned off. Examples of volatile memories include random access memories (RAM), dynamic random access memories (DRAM), static random access memories (SRAM), and other forms of volatile memories. In some examples, storage device(s) 208 stores program instructions for execution by processing circuitry 202. Storage device(s) 208, in one example, are used by software or applications running on computing device 200 to temporarily store information during program execution.

Storage device(s) 208, in some examples, also include one or more computer-readable storage media. Storage device(s) 208 may be configured to store larger amounts of information than volatile memory. Storage device(s) 208 may further be configured for long-term storage of information. In some examples, storage device(s) 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication unit(s) 206. Computing device 200, in one example, utilizes communication unit(s) 206 to communicate with external devices via one or more networks, such as one or more wired/wireless/mobile networks. Communication unit(s) 206 may include a network interface, such as an Ethernet card, an optical transceiver, a radio frequency transceiver, or any other type of device that can send and receive information. Other examples of such network interfaces may include 3G/4G/5G and WiFi radios. In some examples, communication unit(s) 206 may include a plurality of high-speed network interface cards. In some examples, computing device 200 uses communication unit(s) 206 to communicate with an external device. For example, computing device 200 uses communication unit(s) 206 to communicate with other network devices 110 and/or client devices 100 of FIG. 1 via links 16 of FIG. 1 with which communication unit(s) 206 are connected.

Computing device 200, in one example, also includes one or more user interface device(s) 210. User interface devices 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an administrator of service provider networks 150 may enter configuration data for computing device 200.

One or more output device(s) 212 may also be included in computing device 200. Output device(s) 212, in some examples, is configured to provide output to a user using tactile, audio, or video stimuli. Output device(s) 212, in one example, includes a presence-sensitive display, a sound card, a video graphics adapter card, or any other type of device for converting a signal into an appropriate form understandable to humans or machines. Additional examples of output device(s) 212 include a speaker, a cathode ray tube (CRT) monitor, a liquid crystal display (LCD), or any other type of device that can generate intelligible output to a user.

Computing device 200 may include operating system 216. Operating system 216, in some examples, controls the operation of components of computing device 200. For example, operating system 216, in one example, facilitates the communication of one or more applications 222 with processing circuitry 202, communication unit(s) 206, storage device(s) 208, input device(s) 204, user interface device(s) 210, and output device(s) 212. Applications 222 may also include program instructions and/or data that are executable by computing device 200.

In some examples, processing circuitry 202 executes routing component 250, which determines routes of received packets and forwards the packets accordingly. Routing component 250 may communicate with other routers, e.g., such as network devices 110 of FIG. 1, to establish and maintain a computer network, such as computer network system 2 of FIG. 1, for transporting network traffic between one or more customer devices. Routing protocol daemon (RPD) 254 of routing component 250 may execute software instructions to implement one or more control plane networking protocols 256. For example, protocols 256 may include one or more routing protocols, such as IGMP 221 and/or Border Gateway Protocol (BGP) 220, for exchanging routing information with other routing devices and for updating routing information base (RIB) 252, Multiprotocol Label Switching (MPLS) protocol 215, PIM 225, and other routing protocols. Protocols 256 may further include one or more communication session protocols 223, such as TCP, UDP, TLS, or ICMP. Protocols 256 additionally includes BFD 224.

Routing information 252 may describe a topology of the computer network in which computing device 200 resides, and may also include routes through the shared trees in the computer network. Routing information 252 may describe various routes within the computer network, and the appropriate next hops for each route, e.g., the neighboring routing devices along each of the routes. Routing information 252 may be programmed into dedicated forwarding chips, a series of tables, a complex database, a link list, a radix tree, a database, a flat file, or various other data structures.

Session information 235 stores information for identifying sessions. In some examples, session information 235 is in the form of a session table. For example, services information 232 includes one or more entries that specify a session identifier. In some examples, the session identifier includes one or more of a source address, source port, destination address, destination port, or protocol associated with a forward packet flow and/or a reverse packet flow of the session. As described above, when routing component 250 receives a packet for a forward packet flow originating from client device 100A and destined for client device 100B of FIG. 1, routing component 250 determines whether the packet belongs to a new session (e.g., is the "first" packet or "lead" packet of session 40). To determine whether the packet belongs to a new session, routing component 250 determines whether session information 235 includes an entry corresponding to a source address, source port, destination address, destination port, and protocol of the first packet. If an entry exists, then the session is not a new session. If no entry exists, then the session is new and routing component 250 generates a session identifier for the session and stores the session identifier in session information 235. Routing component 250 may thereafter use the session identifier stored in session information 235 for the session to identify subsequent packets as belonging to the same session.

Services information 232 stores information that routing component 250 may use to identify a service associated with a session. In some examples, services information 232 is in the form of a services table. For example, services information 232 includes one or more entries that specify a service identifier and one or more of a source address, source port, destination address, destination port, or protocol associated the service. In some examples, routing component 250 may query services information 232 with one or more of a source address, source port, destination address, destination port, or protocol of a session for a received packet to determine a service associated with a session. For example, routing component 250 may determine a service identifier based on a correspondence of a source address, source port, destination address, destination port, or protocol in services information 232 to a source address, source port, destination address, destination port, or protocol specified by a session identifier. Routing component 250 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing component 250 applies, to the packet, the one or more service policies 234 that correspond to the service associated with the packet.

In some examples, computing device 200 may operate as any of network devices 110 of FIG. 1. With reference to FIG. 2, in the following example, computing device 200 operates as network device 110A. Computing device 200 receives, via communication unit(s) 206, a packet from client device 100A destined for client device 100B. In response to receiving the packet, computing device 200 generates an L3 packet including an L3 header and metadata including a source IP address and a source port of client device 100A and a destination IP address and a destination port of client device 100B.

In some examples, the metadata includes a session identifier. The session identifier is a unique identifier for a session including a first packet flow originating from a first client device (e.g., client device 100A) and destined for a second client device (e.g., client device 100B) and a second packet flow originating from the second client device and destined for the first client device. Typically, the session identifier includes a 5-tuple, e.g., the source IP address and the source port of the first client device, the destination IP address and the destination port of the second client device, and a network protocol used by the session.

In this example, the packet is a first packet of a plurality of packets for the session. In response to receiving the first packet, computing device 200 may generate a session identifier for the session between client device 100A and client device 100B and store the session identifier in session information 235 (e.g., so as to store the metadata of the L3 packet). Computing device 200 may generate, based on the first packet, the L3 packet including the L3 header and the metadata, as described above. Computing device 200 forwards, via communication unit(s) 206, the L3 packet toward the next-hop router, network device 110B.

For subsequent packets, computing device 200 may determine, based on information of the subsequent packets (e.g., 5-tuple), that the subsequent packets belong to the same session as the first packet. For example, in response to receiving a second packet for the session, computing device 200 may perform a lookup of session information 235 and determine, based on the source address, source port, destination address, destination port, and/or protocol specified by the second packet, that the second packet belongs to a session having a corresponding entry within session information 235.

In response to determining that the subsequent packets belong to the same session as the first packet, computing device 200 may generate, for the subsequent packets, subsequent L3 packets that include the L3 header but do not include the metadata (as the session identifier associated with a given session is already stored by, e.g., each subsequent router receiving the first packet).

Computing device 200 may forward the subsequent L3 packets toward the same next-hop network device 110B. Intermediary network devices (e.g., network devices 110B-110H) may receive the subsequent L3 packets and identify, from the L3 header of the subsequent L3 packets, the session associated with the subsequent L3 packets, and use the stored metadata to perform session-based routing of the subsequent L3 packets. In this fashion, computing device 200 may only modify the first L3 packet of the plurality of L3 packets generated for the session to include the metadata, thereby avoiding including the metadata within every packet of the plurality of L3 packets generated for the session while still ensuring that each L3 packet of the plurality of L3 packets is forwarded along the same path (e.g., to the same next-hop network device 110) and that the original packet may be recovered from the L3 packet by an egress router, such as network device 110I.

With reference to FIG. 2, in the following example, computing device 200 operates as network device 110I and receives an L3 packet modified as described above from network device 110H. For example, computing device 200 receives, via communication unit(s) 206, the L3 packet having the L3 header and the metadata.

If the L3 packet is a first L3 packet of a plurality of L3 packets for the session, computing device 200 may use the metadata to generate a session identifier for the session between client device 100A and client device 100B and store the session identifier in session information 235 (e.g., so as to store the metadata of the L3 packet). In response to determining the packet is destined for a client device coupled to network device 110I, computing device 200 may use the metadata of the L3 packet to recover the original packet. For example, computing device 200 may use the metadata to modify the header of the packet to specify the original source address, source port, destination address, and destination port. Computing device 200 then forwards the recovered packet to client device 100B.

Computing device 200 may further receive subsequent L3 packets of the plurality of L3 packets that do not include the metadata. For these subsequent L3 packets, computing device 200 may determine, based on the L3 header (e.g., the source IP address and source port of a previous-hop router and the destination IP address and destination port of network device 110I), that the subsequent L3 packets belong to the same session as the first L3 packet. Computing device 200 may determine the original destination port and destination address of the packet from the stored metadata for the first L3 packet. Computing device 200 may forward, via communication unit(s) 206, the subsequent packets to client device 100A. In this fashion, computing device 200 may receive only a first L3 packet that specifies the metadata, while subsequent L3 packets do not include such information. Thereby, network devices 110 as described herein may avoid including the metadata within every packet of the plurality of L3 packets generated for the session while still ensuring that each L3 packet of the plurality of L3 packets is forwarded along the same path (e.g., to the same next-hop network device 110).

In accordance with the techniques of the disclosure, computing device 200 may exchange PIM messages across an L3 transport network, such as one or more service provider networks 150 of FIG. 1, with one or more network devices, such as network devices 110 of FIG. 1.

As an example, computing device 200 operates as network device 110A of FIG. 1. Routing component 250 learns, via a routing protocol such as BGP, the address of a virtual loopback interface of network device 110B associated with a PIM service between computing device 200 and 110B for a multicast service and stores such information in PIM multicast information 262. Routing component 250 receives, from multicast sender device 100A of FIG. 1, a multicast packet for a multicast group associated with the multicast service. Routing component 250 generates, based at least in part on the multicast packet, a unicast L3 packet carrying a PIM register request destined to an RP device and configured to register computing device 200 as a multicast source for the multicast group. The header of the unicast L3 packet specifies a source address that is a network address translation (NAT) of the address of the virtual loopback interface of network device 110B. In some examples, routing component 250 performs a NAT of an address of the multicast sender device to the address of the virtual loopback interface of network device 110B. In some examples, routing component 250 performs a NAT of an address of computing device 200 to the address of the virtual loopback interface of network device 110B. Routing component 250 forwards the unicast L3 packet to network device 110B across the L3 transport network 150A.

As another example, computing device 200 operates as network device 110B of FIG. 1. Routing component 250 defines a PIM service between network device 110A and computing device 200. Routing component 250 establishes virtual loopback interface 260 and stores information for the PIM service, including an association between the PIM service and an address of virtual loopback interface 260, in services information 232. In some examples, the address of virtual loopback interface 260 is used as a service identifier for the PIM service between network device 110A and computing device 200 for the multicast service.

Routing component 250 receives, from network device 110A via L3 transport network 150A, a unicast L3 packet. The unicast L3 packet includes a header which specifies a source address of the address of virtual loopback interface 260. Routing component 250 determines, based at least in part on the stored association between the PIM service and the address of virtual loopback interface 260, that the PIM register request from network device 110A is associated with the multicast group associated with the multicast service. Routing component 250 registers network device 110A as a multicast source for the multicast group associated with the multicast service and stores the registration for network device 110A within PIM multicast information 262.

Figure 3A:
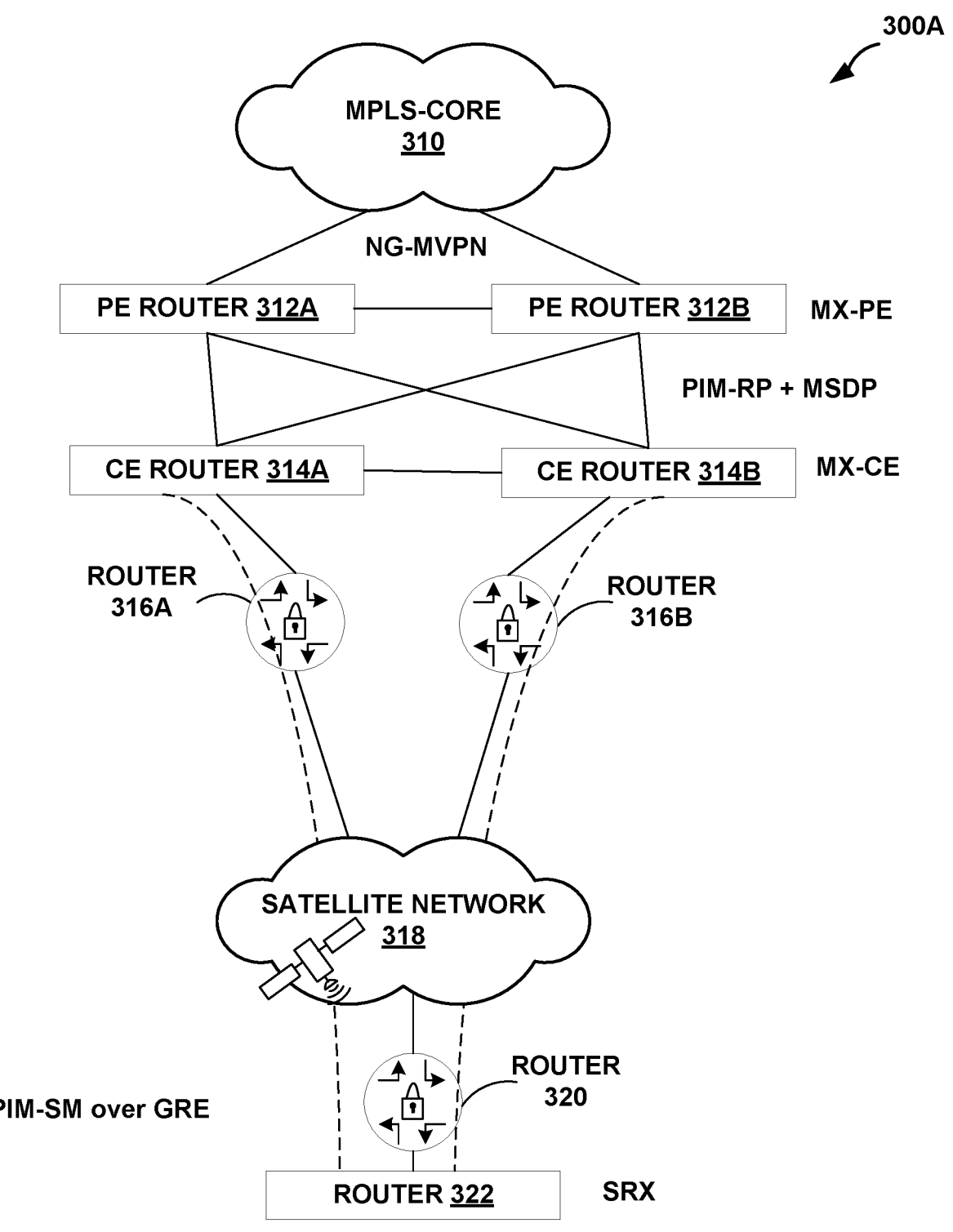
FIGS. 3A-3B are a block diagrams illustrating example computer network systems in accordance with the techniques of the disclosure.

FIG. 3A is a block diagram illustrating an example computer network system 300A that is not configured in accordance with the techniques of the disclosure. More specifically, FIG. 3A depicts a system 300A that uses GRE tunnels to achieve multicast packet distribution. System 300A includes MPLS core 310, provider edge (PE) routers 312A-312B (collectively, "PE routers 312"), customer edge (CE) routers 314A-314B (collectively, "CE routers 314"), routers 316A-316B (collectively, "routers 316"), satellite network 318, router 320, and router 322. In some examples, PE routers 312 are MX routers offered by Juniper Networks, Inc. that provide PE functionality. In some examples, CE routers 314 are MX routers offered by Juniper Networks, Inc. that provide CE functionality. PE routers 312 and CE routers 314 may communicate using PIM-RP and Multicast Source Discovery Protocol (MSDP).

Satellite network 318 operates as an intermediate access or transport network between routers 316 and router 320. Routers 316 and router 320 may communicate via PIM-SM over GRE. Router 320 may operate as a gateway or access point for router 322 into satellite network 318. Router 322 may be an SRX router offered by Juniper Networks, Inc.

Unlike a system configured with the techniques of the disclosure, such as FIG. 3B (discussed in more detail below), computer network system 300A may be unable to implement a PIM architecture for multiple multicast services. This is because routers 316, upon receiving a PIM message via GRE tunnels, may be unable to identify for which multicast service or for which multicast sender the PIM message is intended. Such a conventional PIM message may not include any information that routers 316 may use to identify a multicast service from other multicast services, thereby preventing the implementation of PIM within an L3 transport network.

Figure 3B:
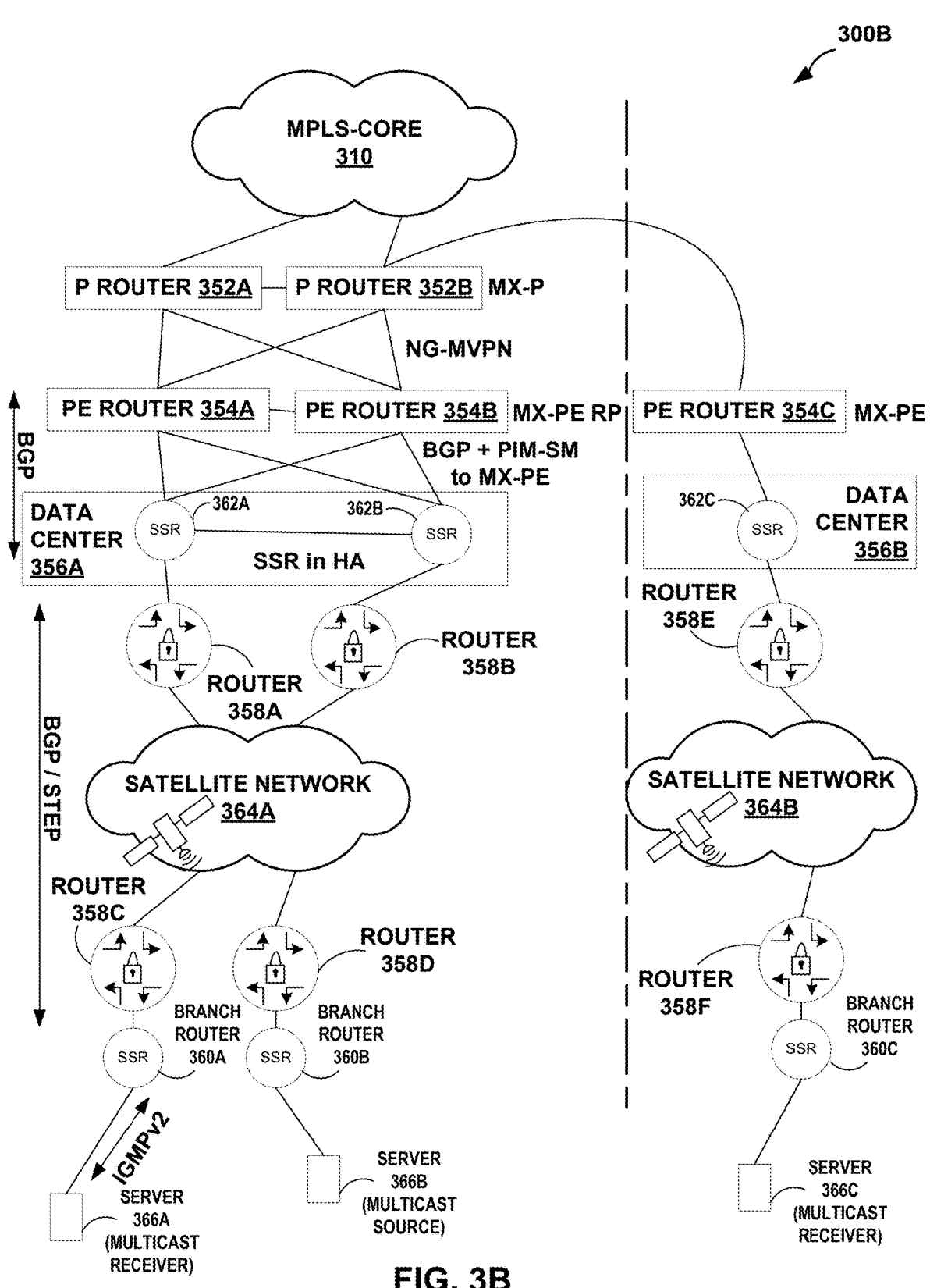

FIG. 3B is a block diagrams illustrating example computer network system 300B in accordance with the techniques of the disclosure. More specifically, FIG. 3B depicts a system 300B that uses PIM over a session-based routing network to achieve multicast packet distribution. FIG. 3B includes MPLS core 310, provider routers 352A-352B (collectively, "P routers 352"), PE routers 354A-354C (collectively, "PE routers 354"), data centers 356A-356B ("collectively, "data centers 356"), which include routers 362A-362C (collectively, "routers 362"), routers 358A-358F (collectively, "routers 358"), satellite networks 364A-364B (collectively, "satellite networks 364"), branch routers 360A-360C (collectively, "branch routers 360"), and servers 366A-366C (collectively, "servers 366").

Data center 356A includes routers 362A and 362B, which communicate with PE routers 354A and 354B via BGP and PIM-SM. PE routers 354 may be MX routers offered by Juniper Networks, Inc. Routers 360 and 362 may be Session-smart routers offered by Juniper Networks, Inc. that are capable of performing session-based routing.

Satellite network 364A operates as an intermediate access or transport network between routers 358A, 358B and routers 358C, 358D. Routers 358A, 358B and routers 358C, 358D may communicate via BGP and Service Topology Exchange Protocol (STEP). Routers 358C, 358D operate as gateways or access points for routers 360A, 360B, respectively, into satellite network 364A. Routers 360A operates as a gateway device to provide Layer-3 access to server 366A via IGMPv2. Routers 360B operates as a gateway device to provide Layer-3 access to server 366B via IGMPv2. Servers 366 are examples of endpoint user or customer devices.

Data center 356B includes router 362C, which communicates with PE router 354C and router 358E. Satellite network 364B operates as an intermediate access or transport network between router 358E and router 358F. Router 358F operates as a gateway or access point for router 360C, into satellite network 364B. Router 360C operates as a gateway device to provide Layer-3 access to server 366C via IGMPv2. In the example of FIG. 3B, server 366B is a multicast source device, and servers 366A, 366C are multicast receiver devices.

In accordance with the techniques of the disclosure, PIM is adapted to operate within a session-based routing network. More specifically, as depicted in the example of FIG. 3B, session-based routing routers 358, 362 provide BGP over SVR connectivity to interconnect two remote PIM peers (e.g., router 360A and 360C).

For example, a first branch router 360A connected to a multicast receiver device (server 366A) receives an IGMP multicast group join request from the multicast receiver device 366A. The first branch router 360A may generate a PIM join request and send, via session-based routing, the PIM join request to the RP (PE router 354B). In some examples, the first branch router 360A forms a unicast L3 packet that includes a source address of the first branch router 360A, a destination address of an hub router (e.g., router 362B), metadata specifying a session identifier for a multicast service associated with the multicast group, and a payload including the PIM join request. The hub router 362B may receive the L3 packet and forward the PIM join request encapsulated by the unicast L3 packet to the RP (e.g., PE router 354B), which may be external to the network (or external to data center 356A). The first branch router 360A may store multicast state information specifying the multicast receiver device 366A as a member of the multicast group. The hub router 362B may store multicast information specifying a multicast route to the first branch router 360A for the multicast group.

As another example, a second branch router 360B connected to a multicast source device (e.g., server 366B) receives a multicast packet for the multicast group from the multicast source device (e.g., server 366B). The second branch router 360B may generate a PIM Register message that includes the multicast packet and send, via session-based routing, the PIM Register message to the RP (e.g., PE router 354B). In some examples, the second branch router 360B forms a unicast L3 packet that includes a source address of the second branch router 360B, a destination address of an hub router 362B, metadata specifying a session identifier for a multicast service associated with the multicast group, and a payload including the PIM Register request. The hub router 362B may receive the L3 packet and forward the PIM Register request encapsulated by the unicast L3 packet to the RP, which may be external to the network (e.g., or data center 356A). The second branch router 360B may store multicast state information specifying the multicast source device 366B as a sender for the multicast group. Additionally, for subsequent multicast packets, the second branch router 360B may omit metadata from L3 packets encapsulating corresponding multicast packets.

The hub router 362B may store multicast information specifying a multicast route from the second branch router 360B to the first branch router 360A for the multicast group. Further, the hub router may generate a PIM prune message to remove the RP (e.g., PE router 354B) from the multicast tree such that subsequent multicast traffic is sent from the second router 360B, to the hub 362B, and then directly to the first router 360A, thereby bypassing the RP (e.g., PE router 354B).

In one example, a first network device 360A is configured to receive, from a multicast receiver device 366A, a multicast join request for a multicast group associated with a multicast service; send, based on the received multicast join request, and to a second network device (e.g., such as hub device 362B), a unicast L3 packet including: a header including (1) source address information, the source address information specifying address information of the first network device 360A, and (2) destination address information, the destination address information specifying address information of the second network device 362B; metadata specifying a session identifier for the multicast service; and a payload including a PIM join request destined to a RP device (e.g., PE router 354B) and configured to subscribe the first network device 360A to the multicast group.

In some examples, the first network device is further configured to receive, from the second network device, a second unicast L3 packet including: a second header including (1) second source address information, the second source address information specifying address information of the second network device, and (2) second destination address information, the second destination address information specifying address information of the first network device; second metadata specifying a session identifier for the multicast service; and a second payload including a multicast packet for the multicast group; and forward the multicast packet to the multicast receiver device.

In some examples, the first network device is further configured to store, based on the received multicast join request, multicast state information specifying the multicast receiver as a member of the multicast group. In some examples, the session identifier for the multicast service includes at least a source address that is an address of the multicast receiver device and a source port that is a port of the multicast receiver device. In some examples, the source address information of the header includes: a source address that is an address of the first network system; a source port that is a port of the first network system, and the destination address information of the header includes: a destination address that is an address of the second network device; and a destination port that is a port of the second network device.

In some examples, the first network device is further configured to determine the session identifier for the multicast service based at least in part on a source address and a source port specified by the multicast join request, the source address specifying an address of the multicast receiver device and the source port specifying a port of the multicast receiver device.

In another example, a first network device is configured to receive, from a multicast source device, a multicast packet for a multicast group associated with a multicast service; and send, based on the received multicast packet, and to a second network device, a unicast L3 packet including: a header including (1) source address information, the source address information specifying address information of the first network device, and (2) destination address information, the destination address information specifying address information of the second network device; metadata specifying a session identifier for the multicast service; and a payload including a PIM Register request destined to a RP device and configured to register the first network device as a multicast source for the multicast group.

In some examples, the first network device is further configured to store, based on the received multicast packet, multicast state information specifying the multicast source device as a multicast source for the multicast service.

In another example, a hub network device is configured to receive, from a first branch network device, a first unicast L3 packet including: a first header including (1) first source address information, the first source address information specifying address information of the first branch network device, and (2) first destination address information, the destination address information specifying address information of the hub network device; first metadata specifying a session identifier for a multicast service; and a first payload including a PIM Register request to a RP device configured to register the first branch network device as a multicast source for a multicast group associated with the multicast service; receive, from a second branch network device, a second unicast L3 packet including: a second header including (1) second source address information, the second source address information specifying address information of the second branch network device, and (2) second destination address information, the second destination address information specifying the address information of the hub network device; second metadata specifying the session identifier for the multicast service; and a second payload including a PIM join request destined to the RP device and configured to subscribe the first branch network device to the multicast group; and store, based at least in part on the first unicast L3 packet and the second unicast L3 packet, a multicast route specifying the first branch network device as associated with a multicast source device for the multicast group and the second branch network device as associated with a multicast receiver device for the multicast group.

In some examples, the hub network device is further configured to send, to the first branch network device, a third unicast L3 packet including: a third header including (1) third source address information, the third source address information specifying the address information of the hub network device, and (2) third destination address information, the destination address information specifying address information of the first branch network device; third metadata specifying the session identifier for the multicast service; and a third payload including a PIM join request destined to the first branch network device and configured to subscribe the hub network device to the multicast group; send, to the first branch network device, a fourth unicast L3 packet including: the third header including (1) the third source address information, the third source address information specifying the address information of the hub network device, and (2) the third destination address information, the destination address information specifying address information of the first branch network device; fourth metadata specifying the session identifier for the multicast service; and a payload including a PIM prune request to remove the RP device from the multicast group.

One objective of the techniques of the disclosure is to support full-fledged Any-Source Multicast (ASM) Multicast (PIM/IGMP), with the exception that RP functionality and Multicast Source Discovery Protocol (MSDP) are not needed for the first release. The current FRR routing stack includes PIM Sparse Mode (SM) and IGMP v2 and v3 support. Support is enabled through the session-based routing data model to leverage the FRR PIM/IGMP capabilities.

As depicted in FIGS. 3A-3B, Multicast is migrated and session-based routing routers are introduced. Conventionally, a customer has GRE tunnels through a satellite network. The updated network removes the GRE tunnels and introduce session-based routing routers. One objective is to remove all GRE tunnels and do session-based routing between the session-based routing routers. There may be multiple datacenters connected in this fashion.

The customer may require IGMPv2 and PIM-ASM. The session-based routing routers may not be (at least originally) the RP and may not be used for MSDP source discovery. The multicast sources and receivers are connected to the branch session-based routing routers. There may also be sources located somewhere behind the datacenter session-based routing routers, but not directly connected to them.

The following sections step through the basic sequence of protocol events. PIM is a complicated protocol with many corner cases, so this is not meant to be a full tutorial. It simply goes through some common cases, especially with the expected customer deployment.

Source and Receiver on Different Branch 128T Routers

A receiver on Branch1 Joins. The receiver sends an IGMP Membership Report to the Branch1 128T Router to Join a particular group. This router creates (*,G) forwarding state and then send a PIM (*,G) Join upstream towards the RP. This Join is sent to the Hub 128T Router. The Hub creates (*,G) mroute state. It also sends a (*,G) upstream towards the RP. Once the RP Receives this Join, it creates (*,G) mroute state.

A Source on Branch2 starts sending. Then, a source connected to Branch2 starts sending traffic. The Branch2 128T router creates (S,G) mroute and unicast a PIM Register control message directly to the RP. These PIM Register messages may include a data packet. The RP receives the PIM Register and then send a PIM(S,G) Join towards the source address. The RP forwards the included data packet down the Shared Tree. The Hub receives this PIM Join and create (S,G) mroute state. Note that it still forwards traffic according to the (*,G) Shared Tree entry, until it determines that traffic arrives on the Shortest Path Tree. The Hub sends the PIM Join towards the source address. The Branch2 router receives the (S,G) Join and adds the wan interface (interface that it received the Join) to the outgoing interface list of the (S,G) mroute entry. Now traffic flows from the source to the Hub. The Hub detects that traffic has arrived from the Source, and updates its forwarding to forward using the (S,G) mroute. The Hub sends traffic to both the RP and the Branch1 receiver. The RP detects that traffic is coming in natively, and it unicasts a PIM Register-Stop directly to the First-Hop Router (Branch2). The Hub detects that traffic for this source does not need to be received from the RP anymore. The Hub sends an (S,G) RPT Prune towards the RP. The RP no longer needs to send (S,G) Joins to the source, since the Shortest Path Tree is completely set up. Now multicast traffic flows from Branch2 to the Hub and then to Branch1. Branch1 detects the individual Source address since it is a Last Hop router. It sends a PIM (S,G) Join towards the Source. The (S,G) Join is received by the Hub. This (S,G) Join does not have much effect as far as forwarding in this particular case. The Shortest Path Tree for this (S,G) has already been established at the Hub.

Source Behind RP and Receiver on Branch 128T Router

A receiver on a Branch Router Joins the Group. The receiver sends an IGMP Membership Report to the Branch 128T Router to Join a particular Group. This router creates (*,G) forwarding state and then send a PIM (*,G) Join upstream towards the RP. This Join is sent to the Hub 128T Router. The Hub creates (*,G) mroute state. It also sends a (*,G) upstream towards the RP. Once the RP Receives this Join, it creates (*,G) mroute state.

A source behind the RP starts sending traffic. Once traffic starts flowing, the RP starts sending the traffic to the Hub. The Hub forwards the traffic according to the mroute to the Branch. The Branch forwards the traffic according to the (*,G) mroute. The Branch detects the (S,G) and create (S,G) state. The (S,G) mroute can be programmed immediately since the incoming interface towards the Source and the RP are the same interface. The Source sends a PIM (S,G) Join towards the Source. The Hub receives the PIM (S,G) Join and creates (S,G) mroute state. The Hub sends a PIM Join towards the RP. The Shortest path Tree is then set up to the Source through the RP.

Source on Branch. Receiver both on Branch 128T Router and Behind the RP

The Source on Branch1 Starts First. The Source starts sending the traffic to the Branch1 router. The Branch1 router creates (S,G) mroute state. It unicasts a PIM Register to the RP. The RP creates (S,G) state due to the Register but it does not have any Receivers so it unicasts a PIM Register-Stop to the Branch1. The Branch1 stops sending PIM registers to the RP.

Then a receiver behind the RP Joins. A receiver behind the RP then Joins the Group. The RP receives the PIM (*,G) Join. The RP already has (S,G) state, so it adds the outgoing interface to this mroute. It sends a PIM (S,G) Join towards the Source. The Hub receives the PIM (S,G) Join and creates (S,G) mroute state. The Hub sends a PIM (S,G) Join towards the source. The Branch1 receives the PIM (S,G) Join. It already has (S,G) mroute state, so it adds the outgoing interface to the outgoing interface list. It now starts forwarding this traffic towards the Hub. The traffic flows to the receiver behind the RP.

Then a receiver on Branch2 Joins. Another Receiver on Branch2 joins the Multicast Group by sending an IGMP Membership report. Branch2 creates (*,G) mroute state. It sends a (*,G) PIM Join towards the RP. The Hub receives the (*,G) Join. it creates (*,G) mroute state. It also adds this interface to the outgoing interface of the (S,G) mroute. The Hub sends the (*,G) Join to the RP. Traffic flows from Branch1 to the Hub and then to Branch2. Branch2 creates (S,G) mroute state. Then Branch2 sends a PIM (S,G) Join towards the source.

Service Configuration for Multicast

Services must be created for the Multicast traffic. A service must be defined for the given Group address. There must be a multicast-sender-policy created to allow the sources to send for the Multicast Group. There must be a tenant in order to forward traffic for a source. Additionally, there must be an access-policy that allows Receivers on the outgoing interfaces.

Here is an example config that allows traffic to 225.1.1.1 to arrive on the red tenant. Receivers on the food tenant are allowed to Join this Group.

```
service iptv-service
    name                    iptv-service
    address                      225.1.1.1/32
    access-policy food
                             source food
    exit
    multicast-sender-policy red source red
    exit
exit
```

The multicast service configuration is extended to allow non-host prefixes. When matching a mroute to a multicast service, a longest prefix match is used.

Also, note that there are unicast control messages (Register and Register-Stop) sent between the First-Hop Router and the RP. Once the RP is configured, a Service is auto-generated for the RP address. The user should not configure a service to this RP address, as one is autogenerated.

Multicast Protocol Configuration

Support is added to enable Multicast protocols configuration on network interfaces. There is a global PIM command to set the RP address for a Multicast group range.

PIM can be configured in the config hierarchy:

authority router< >routing default-instance {vrf< >} pim

Here, an RP can be configured with rp<group-addr/mask>address<rp-address>

The group-range of the RP is the first argument. If the RP should be configured for all Groups, then 224/4 can be set as the group/mask. The RP address can be a local address, in which case, this router acts as an RP for the given group range (not supported in first release, however)

PIM is configured on an interface similar to how OSPF is configured on an interface:

Interface<node> <network-interface>

IGMP is similar, and can be configured in the config hierarchy:

authority router< >routing default-instance {vrf< >} igmp

IGMP is configured on an interface similar to PIM

Interface<node> <network-interface>

Multicast is supported in the 128T data-model as follows:

```
authority
  router A
    routing default-instance
      pim
        rp 10.10.10.2 224.0.0.0/4
        interface T217_DUT2 inet30
          node T217_DUT2
          interface inet30
      igmp
        interface T217_DUT2 inet30
          node T217_DUT2
          interface inet30
          version 2
```

This can also be enabled in a vrf:

```
authority
  router A
    routing default-instance
      vrf vrfA
        pim
          rp 20.20.20.2 224.0.0.0/4
          interface T217_DUT2 inet40
            node T217_DUT2
            interface inet40
        igmp
          interface T217_DUT2 inet40
            node T217_DUT2
            interface inet40
```

Multicast Over SVR Configuration

Multicast over SVR does not need to be explicitly configured. Multicast over SVR configuration is autogenerated if BGPoSVR is configured on the session-based routing routers and there exists PIM RP configuration on both BGP routers. Therefore BGPoSVR is a prerequisite for Multicast over SVR. PIM is typically not configured on the WAN interfaces. This multicast configuration is autogenerated.

The show commands that are available in FRR are made available through the session-based routing PCLI. REST endpoints with JSON output are provided so even though the GUI is not modified, the GUI displays the JSON output via the REST endpoint.

Show Commands

Here are examples of supported commands. The list is not exhaustive and commands may be removed or added. Also included below is an example output for each command from FRR. The session-based routing router may get the JSON output from FRR and may display it in a different format. The session-based routing 'detail' version of the commands shows the full JSON output.

Note that each show command allows a vrf option:

show ip igmp [vrf<vrfname>] . . .

show ip pim [vrf<vrfname>] . . .

The 'vrf' option is removed in below commands for brevity. The table output shown for below commands has example output from the FRR display. The table output (brief verbosity of each command) may be different on 128T PCLI. The detailed display on session-based routing shows the full JSON output.

Show igmp interface

```
t231-dut4.openstacklocal# show ip igmp int
Interface   State  Address     V   Querier   Query Timer  Uptime
g10         mtrc   11.1.10.4   3   other     --:--:--     00:11:38
g60         up     11.1.60.4   3   local     00:00:22     00:00:09
t231-dut4.openstacklocal# show ip igmp int json
{
      "g10":{
      "name":"g10",
      "state":"up",
      "address":"11.1.10.4",
      "index":6,
      "flagMulticast":true,
      "flagBroadcast":true,
      "lanDelayEnabled":true,
      "upTime":"00:14:21",
      "version":3,
      "mtraceOnly":true,
      },
  "g60":{
      "name":"g60",
      "state":"up",
      "address":"11.1.60.4",
      "index":8,
      "flagMulticast":true,
      "flagBroadcast":true,
      "lanDelayEnabled":true,
      "upTime":"00:02:52",
      "version":3,
      "querier":true,
      "queryTimer":"00:01:49"
      }
}
```

Note in the above output, that an interface is shown with "State:mtrc" if the interface has PIM enabled, but not IGMP. If the interface has IGMP enabled, it shows as "State:up".

Show igmp groups

```
t231-dut5.openstacklocal# show ip igmp groups
Total IGMP groups: 4
Watermark warn limit(Not Set): 0
Interface   Address     Group       Mode Timer     Srcs   V   Uptime
g60         11.1.60.5   239.0.1.7   EXCL 00:03:01   1      3   149:54:31
g60         11.1.60.5   239.0.1.5   EXCL 00:03:01   1      3   149:54:31
loopback    10.5.0.1    239.0.1.1   EXCL 00:03:09   1      3   221:40:01
loopback    10.5.0.1    239.0.1.5   EXCL 00:03:09   1      3   221:39:58
t231-dut5.openstacklocal# show ip igmp groups json
{
    "totalGroups":4,
    "watermarkLimit":0,
    "g60":{
        "name":"g60",
```

-continued

```
        "state":"up",
        "address":"11.1.60.5",
        "index":10,
        "flagMulticast":true,
        "flagBroadcast":true,
        "lanDelayEnabled":true,
        "groups":[
            {
                "source":"11.1.60.5",
                "group":"239.0.1.7",
                "mode":"EXCLUDE",
                "timer":"00:02:55",
                "sourcesCount": 1,
                "version":3,
                "uptime":"149:54:37"
            },
            {
                "source":"11.1.60.5",
                "group":"239.0.1.5",
                "mode":"EXCLUDE",
                "timer":"00:02:55",
                "sourcesCount":1,
                "version":3,
                "uptime":"149:54:37"
            }
        ]
    },
"loopback":{
        "name":"loopback",
        "state":"up",
        "address":"10.5.0.1",
        "index":12,
        "flagMulticast":true,
        "lanDelayEnabled":true,
        "groups":[
            {
                "source":"10.5.0.1",
                "group":"239.0.1.1",
                "mode":"EXCLUDE",
                "timer":"00:03:03",
                "sourcesCount":1,
                "version":3,
                "uptime":"221:40:07"
            },
            {
                "source":"10.5.0.1",
                "group":"239.0.1.5",
                "mode":"EXCLUDE",
                "timer":"00:03:03",
                "sourcesCount":1,
                "version":3,
                "uptime":"221:40:04"
            }
        ]
    }
}
```

```
t231-dut5.openstacklocal# show ip mroute
IP Multicast Routing Table
Flags:      S - Sparse, C - Connected, P - Pruned
            R - RP-bit set, F - Register flag, T - SPT-bit set
Source      Group       Flags Proto   Input          Output TTL  Uptime
*           239.0.1.1   SC            IGMP    g60     pimreg      1
11.1.30.3   239.0.1.4   SFT           PIM     g30     g60         1
*           239.0.1.5   SC            IGMP    g60     pimreg      1
t231-dut5.openstacklocal# show ip mroute json
{
        "239.0.1.1":{
        "*":{
            "installed":1,
            "refCount":2,
            "oilSize":2,
            "OilInheritedRescan":0,
            "iif":"g60",
            "upTime":"00:23:43",
            "flags":"SC",
```

-continued

```
"oil":{
        "pimreg":{
                "source":"*",
                "group":"239.0.1.1",
                "protocolIgmp":true,
                "inboundInterface":"g60",
                "iVifI":2,
                "outboundInterface":"pimreg",
                "oVifI":0,
                "ttl":1,
                "upTime":"00:23:43"
        },
        "loopback":{
                "source":"*",
                "group":"239.0.1.1",
                "protocolPim":true,
                "protocolIgmp":true,
                "inboundInterface":"g60",
                "iVifI":2,
                "outboundInterface":"loopback",
                "oVifI":3,
                "ttl":1,
                "upTime":"00:23:43"
        }
    }
  }
},
"239.0.1.4":{
  "11.1.30.3":{
    "installed":1,
    "refCount":1,
    "oilSize":1,
    "OilInheritedRescan":0,
    "iif":"g30",
    "upTime":"00:04:15",
    "flags":"ST",
    "oil":{
        "g60":{
                "source":"11.1.30.3",
                "group":"239.0.1.4",
                "protocolPim":true,
                "inboundInterface":"g30",
                "iVifI":1,
                "outboundInterface":"g60",
                "oVifI":2,
                "ttl":1,
                "upTime":"00:04:15"
        }
    }
  }
},
"239.0.1.5":{
  "*":{
    "installed":1,
    "refCount":2,
    "oilSize":2,
    "OilInheritedRescan":0,
    "iif":"g60",
    "upTime":"00:23:43",
    "flags":"SC",
    "oil":{
        "pimreg":{
                "source":"*",
                "group":"239.0.1.5",
                "protocolIgmp":true,
                "inboundInterface":"g60",
                "iVifI":2,
                "outboundInterface":"pimreg",
                "oVifI":0,
                "ttl":1,
                "upTime": "00:23:43"
        },
        "loopback":{
                "source":"*",
                "group":"239.0.1.5",
                "protocolPim":true,
                "protocolIgmp":true,
                "inboundInterface":"g60",
                "iVifI":2,
```

```
                    "outboundInterface":"loopback",
                    "oVifT":3,
                    "ttl":1,
                    "upTime":"00:23:43"
                }
            }
        }
    }
}
```

Show pim interface

```
t231-dut4.openstacklocal# show ip pim int
Interface   State     Address       PIM   Nbrs   PIM DR    FHR   IfChannels
g10         up        11.1.10.4           1      local     0     0
g60         up        11.1.60.4           1 1    1.1.60.5  0     0
pimreg      up        0.0.0.0             0      local     0     0
t231-dut4.openstacklocal# show ip pim int json
{
    "g10":{
            "name":"g10",
            "state":"up",
            "address":"11.1.10.4",
            "index":6,
            "flagMulticast":true,
            "flagBroadcast":true,
            "lanDelayEnabled":true,
            "pimNeighbors":1,
            "pimIfChannels":0,
            "firstHopRouterCount":0,
            "pimDesignatedRouter":"11.1.10.4",
            "pimDesignatedRouterLocal":true
    },
    "g60":{
            "name":"g60",
            "state":"up",
            "address":"11.1.60.4",
            "index":8,
            "flagMulticast":true,
            "flagBroadcast":true,
            "lanDelayEnabled":true,
            "pimNeighbors":1,
            "pimIfChannels":0,
            "firstHopRouterCount":0,
            "pimDesignatedRouter":"11.1.60.5"
    },
    "pimreg":{
            "name":"pimreg",
            "state":"up",
            "address":"0.0.0.0",
            "index":12,
            "lanDelayEnabled":true,
            "pimNeighbors":0,
            "pimIfChannels":0,
            "firstHopRouterCount":0,
            "pimDesignatedRouter":"0.0.0.0",
            "pimDesignatedRouterLocal":true
    }
}
t231-dut4.openstacklocal# show ip pim json
Interface   Address     Source   Group       State    Uptime    Expire   Prune
g4          10.4.1.1    *        239.0.1.1   NOINFO   --:--:--  --:--    --:--
g60         11.1.60.4   *        239.0.1.1   JOIN     03:37:09  02:59    --:--
g60         11.1.60.4   *        239.0.1.3   JOIN     00:04:10  02:59    --:--
g60         11.1.60.4   *        239.0.1.5   JOIN     03:37:06  02:59    --:--
loopback    10.4.0.1    *        239.0.1.4   NOINFO   --:--:--  --:--    --:--
t231-dut4.openstacklocal# show ip pim join json
{
    "g4":{
            "name":"g4",
            "state":"up",
            "address":"10.4.1.1",
            "index":5,
            "flagMulticast":true,
            "flagBroadcast":true,
            "lanDelayEnabled":true,
```

-continued

```
          "239.0.1.1":{
                    "*":{
                         "source":"*",
                         "group":"239.0.1.1",
                         "upTime":"--:--:--",
                         "expire":"--:--",
                         "prune":"--:--",
                         "channelJoinName":"NOINFO",
                         "protocolIgmp":1
                    }
          }
},
"g60":{
          "name":"g60",
          "state":"up",
          "address":"11.1.60.4",
          "index":8,
          "flagMulticast":true,
          "flagBroadcast":true,
          "lanDelayEnabled":true,
          "239.0.1.1":{
                    "*":{
                         "source":"*",
                         "group":"239.0.1.1",
                         "upTime":"03:37:35",
                         "expire":"02:32",
                         "prune":"--:--",
                         "channelJoinName":"JOIN",
                         "protocolPim":1
                    }
          },
          "239.0.1.3":{
                    "*":{
                         "source":"*",
                         "group":"239.0.1.3",
                         "upTime":"00:04:36",
                         "expire":"02:32",
                         "prune":"--:--",
                         "channelJoinName":"JOIN",
                         "protocolPim":1
                    }
          },
          "239.0.1.5":{
                    "*":{
                         "source":"*",
                         "group":"239.0.1.5",
                         "upTime":"03:37:32",
                         "expire":"02:32",
                         "prune":"--:--",
                         "channelJoinName":"JOIN",
                         "protocolPim":1
                    }
          }
},
"loopback": {
  "name":"loopback",
  "state":"up",
  "address":"10.4.0.1",
  "index":10,
  "flagMulticast":true,
  "lanDelayEnabled":true,
  "239.0.1.4":{
                    "*":{
                         "source":"*",
                         "group":"239.0.1.4",
                         "upTime":"--:--:--",
                         "expire":"--:--",
                         "prune":"--:--",
                         "channelJoinName":"NOINFO",
                         "protocolIgmp":1
                    }
          }
  }
}
```

Show pim neighbor

```
t231-dut4.openstacklocal# show ip pim nei
Interface    Neighbor    Uptime     Holdtime DR    Pri
g10          11.1.10.2   00:28:50   00:01:25       1
g60          11.1.60.5   00:28:04   00:01:41       1
t231-dut4.openstacklocal# show ip pim nei json
{
    "g10":{
            "11.1.10.2":{
                "interface":"g10",
                "neighbor":"11.1.10.2",
                "upTime":"00:28:53",
                "holdTime":"00:01:22",
                "holdTimeMax":105,
                "drPriority":1
            }
    },
    "g60":{
            "11.1.60.5":{
                "interface":"g60",
                "neighbor":"11.1.60.5",
                "upTime":"00:28:07",
                "holdTime":"00:01:38",
                "holdTimeMax": 105,
                "drPriority":1
            }
    }
}
```

Show pim rp-info

```
t231-dut2.openstacklocal# show ip pim rp-info
RP address    group/prefix-list    OIF    I am RP    Source
11.1.10.2     224.0.0.0/4          g10    yes        Static
11.1.60.4     225.0.0.0/16         g10    no         Static
11.1.30.5     226.0.0.0/25         g10    no         Static
t231-dut2.openstacklocal# show ip pim rp-info json
{
    "11.1.10.2":[
            {
                "rpAddress":"11.1.10.2",
                "outboundInterface":"g10",
                "iAmRP":true,
                "group":"224.0.0.0\/4",
                "source":"Static"
            }
    ],
    "11.1.60.4":[
            {
                "rpAddress":"11.1.60.4",
                "outboundInterface":"g10",
                "iAmRP":false,
                "group":"225.0.0.0\/16",
                "source":"Static"
            }
    ],
    "11.1.30.5":[
            {
                "rpAddress":"11.1.30.5",
                "outboundInterface":"g10",
                "iAmRP":false,
                "group":"226.0.0.0\/25",
                "source":"Static"
            }
    ]
}
```

Show pim state

```
t231-dut2.openstacklocal# show ip pim state
Codes: J -> Pim Join, I -> IGMP Report, S -> Source, * ->
Inherited from (*,G), V -> VxLAN,
M -> Muted
Active  Source  Group      RPT  IIF   OIL
1       *       239.0.1.1  y    g10   pimreg(I ), loopback(I)
1       *       239.0.1.3  y    g10   g10( J )
1       *       239.0.1.4  y    g10   g10( J )
1       *       239.0.1.5  y    g10   g10( J )
t231-dut2.openstacklocal# show ip pim state json
{
    "239.0.1.1":{
        "*":{
            "g10":{
                "pimreg":{
                    "source":"*",
                    "group":"239.0.1.1",
                    "inboundInterface":"g10",
                    "outboundInterface":"pimreg",
                    "installed":1
                },
                "loopback":{
                    "source":"*",
                    "group":"239.0.1.1",
                    "inboundInterface":"g10",
                    "outboundInterface":"loopback",
                    "installed":1
                }
            },
            "Installed":1,
            "isRpt":true,
            "RefCount":2,
            "OilListSize":2,
            "OilRescan":1,
            "LastUsed":0,
            "PacketCount":0,
            "ByteCount":0,
            "WrongInterface":0
        }
    },
    "239.0.1.3":{
        "*":{
            "g10":{
                "g10":{
                    "source":"*",
                    "group":"239.0.1.3",
                    "inboundInterface":"g10",
                    "outboundInterface":"g10",
                    "installed":1
                }
            },
            "Installed":1,
            "isRpt":true,
            "RefCount":1,
            "OilListSize":1,
            "OilRescan":1,
            "LastUsed":0,
            "PacketCount":0,
            "ByteCount":0,
            "WrongInterface":0
        }
    },
    "239.0.1.4":{
        "*":{
            "g10":{
                "g10":{
                    "source":"*",
                    "group":"239.0.1.4",
                    "inboundInterface":"g10",
                    "outboundInterface":"g10",
                    "installed":1
                }
            },
            "Installed":1,
            "isRpt":true,
            "RefCount":1,
            "OilListSize":1,
            "OilRescan":1,
```

-continued

```
            "LastUsed":0,
            "PacketCount":0,
            "ByteCount":0,
            "WrongInterface":0
            }
      },
      "239.0.1.5":{
      "*":{
            "g10":{
                "g10":{
                    "source":"*",
                    "group":"239.0.1.5",
                    "inboundInterface":"g10",
                    "outboundInterface":"g10",
                    "installed":1
                    }
                },
                "Installed":1,
                "isRpt":true,
                "RefCount":1,
                "OilListSize":1,
                "OilRescan":1,
                "LastUsed":0,
                "PacketCount":0,
                "ByteCount":0,
                "WrongInterface":0
            }
        }
    }
}
```

Example Output for Implemented Show Commands

Here are examples of all the show commands added for Multicast control plane state.
Show pim interface:

| Interface | State | Address | PIM Nbrs | PIM DR | FHR |
|---|---|---|---|---|---|
| pimreg | up | 0.0.0.0 | 0 | 0.0.0.0 | 0 |
| pim000000000001 | up | 16.0.0.2 | 1 | 16.0.0.2 | 0 |
| g111 | up | 172.16.111.2 | 1 | local | 0 |
| pim000000000000 | up | 16.0.0.2 | 1 | 16.0.0.2 | 0 |

There is a 'pimreg' interface as this is automatically created by FRR. The generated PIM interfaces for each BGPoSVR peer are the interface that begin with 'pim'.
Show pim neighbor

| Interface | Neighbor | Uptime | Holdtime | DR Pri |
|---|---|---|---|---|
| pim000000000001 | 10.5.0.1 | 22:51:39 | 00:01:15 | 1 |
| g111 | 172.16.111.6 | 22:51:32 | 00:01:15 | 1 |
| pim000000000000 | 10.4.0.1 | 22:51:39 | 00:01:15 | 1 |

Show pim join

| Interface | Address | Source | Group | State | Uptime | Expire | Prune |
|---|---|---|---|---|---|---|---|
| pim000000000001 | 16.0.0.2 | * | 227.0.0.100 | up | 00:04:22 | 02:43 | --:-- |
| pim000000000001 | 16.0.0.2 | * | 226.0.0.140 | up | 00:04:22 | 02:43 | --:-- |
| pim000000000001 | 16.0.0.2 | * | 226.0.0.41 | up | 00:04:22 | 02:43 | --:-- |
| pim000000000001 | 16.0.0.2 | * | 226.0.0.40 | up | 00:04:22 | 02:43 | --:-- |
| pim000000000001 | 16.0.0.2 | 10.111.1.7 | 226.0.0.11 | up | 00:04:22 | 02:43 | --:-- |
| pim000000000001 | 16.0.0.2 | * | 226.0.0.10 | up | 00:04:22 | 02:43 | --:-- |
| pim000000000000 | 16.0.0.2 | * | 227.0.0.100 | up | 00:04:52 | 02:43 | --:-- |
| pim000000000000 | 16.0.0.2 | 10.111.1.7 | 226.0.0.11 | up | 00:04:51 | 02:43 | --:-- |
| pim000000000000 | 16.0.0.2 | * | 226.0.0.10 | up | 00:04:51 | 02:43 | --:-- |

Show pim state

| | Active Source | Group | RPT | IIF | OIL |
|---|---|---|---|---|---|
| 1 | * | 226.0.0.140 | y | g111 | pim000000000001 |
| 1 | * | 226.0.0.41 | y | g111 | pim000000000001 |
| 1 | * | 227.0.0.100 | y | g111 | pim000000000001, pim000000000000 |
| 1 | * | 226.0.0.40 | y | g111 | pim000000000001 |
| 1 | * | 226.0.0.10 | y | g111 | pim000000000001, pim000000000000 |
| 1 | 10.111.1.7 | 226.0.0.11 | n | g111 | pim000000000001, pim000000000000 |

Show pim mroute
IP Multicast Routing Table
    Flags: S—Sparse, C—Connected, P—Pruned, R—RP-bit set, F—Register flag, T—SPT-bit set

| Source | Group | Flags | Proto | Input | Output | TTL | Uptime |
|---|---|---|---|---|---|---|---|
| * | 226.0.0.140 | SP | | g111 | pim000000000001 | None | 06:38:34 |
| * | 226.0.0.41 | SP | | g111 | pim000000000001 | None | 22:53:29 |
| * | 227.0.0.100 | SP | | g111 | pim000000000001 | None | 22:53:27 |
| * | 227.0.0.100 | SP | | g111 | pim000000000000 | None | 22:53:27 |
| * | 226.0.0.40 | SP | | g111 | pim000000000001 | None | 22:53:29 |
| * | 226.0.0.10 | SP | | g111 | pim000000000001 | None | 22:53:29 |
| * | 226.0.0.10 | SP | | g111 | pim000000000000 | None | 22:53:29 |
| 10.111.1.7 | 226.0.0.11 | STP | | g111 | pim000000000001 | None | 02:18:04 |
| 10.111.1.7 | 226.0.0.11 | STP | | g111 | pim000000000000 | None | 02:18:04 |

Show pim rp-info:

| RP Address | Group/Prefix-List | OIF | I am RP | Source |
|---|---|---|---|---|
| 172.16.111.6 | 226.0.0.0/24 | g111 | no | Static |
| 10.111.1.6 | 227.0.0.0/24 | g111 | no | Static |

Show igmp interface

| Interface | State | Address | Version | Querier | Query Timer | Uptime |
|---|---|---|---|---|---|---|
| pim000000000000 | up | 10.5.0.1 | 3 | other | --:---:-- | 22:58:06 |
| g15 | up | 10.5.1.1 | 3 | local | 00:00:25 | 22:57:15 |
| g25 | up | 10.5.2.1 | 3 | local | 00:00:58 | 06:04:10 |

Show igmp groups

| Interface | Address | Group | Mode | Timer | Srcs | Version | Uptime |
|---|---|---|---|---|---|---|---|
| g25 | 10.5.2.1 | 226.0.0.11 | INCLUDE | --:--:-- | 1 | 3 | 06:05:40 |
| g25 | 10.5.2.1 | 226.0.0.10 | EXCLUDE | 00:03:51 | 1 | 3 | 06:05:40 |
| g15 | 10.5.1.1 | 226.0.0.41 | EXCLUDE | 00:03:16 | 1 | 3 | 22:58:45 |
| g15 | 10.5.1.1 | 226.0.0.40 | EXCLUDE | 00:03:16 | 1 | 3 | 22:58:45 |
| g15 | 10.5.1.1 | 226.0.0.11 | INCLUDE | --:--:-- | 1 | 3 | 22:58:45 |
| g15 | 10.5.1.1 | 226.0.0.10 | EXCLUDE | 00:03:16 | 1 | 3 | 22:58:45 |

-continued

| Interface | Address | Group | Mode | Timer | Srcs | Version | Uptime |
|-----------|---------|-------|------|-------|------|---------|--------|
| g15 | 10.5.1.1 | 227.0.0.100 | EXCLUDE | 00:03:16 | 1 | 3 | 22:37:10 |
| g15 | 10.5.1.1 | 226.0.0.140 | EXCLUDE | 00:03:16 | 1 | 3 | 06:43:50 |

Constraints

FRR code is used for Multicast routing (PIM/IGMP). The FRR code has a limit of 255 Multicast-enabled interfaces (MAXVIFS) per vrf. However, the kernel has a lower limit of 32 MAXVIFs per vrf. Kernel changes may be needed to scale beyond this limit.

The techniques of the disclosure support PIM Sparse-Mode, Static Configuration of RP, IGMP v2/v3, Multicast over SVR in Hub and Spoke topology. In addition, the techniques of the disclosure contemplate the use of PIM-SSM, Ability to be RP. PIM Assert processing is done when there are multiple senders on a LAN. If this is not suspected to be needed by the customer, then this may be deprioritized. It is assumed that BGP over SVR is configured when running Multicast over SVR.

FIG. 4 is a flow diagram illustrating an example operation in accordance with the techniques of the disclosure. FIG. 4 is described with respect to FIG. 1 for convenience. As depicted in the example of FIG. 4, network devices 110 exchange PIM messages across an L3 transport network, such as one or more service provider networks 150.

Network device 110B defines a PIM service between network device 110A and network device 110B for the multicast service. In this example, network device 110A and network device 110B may or may not be directly connected. For example, one or more intermediate network devices (not depicted in the example of FIG. 1) of service provider network 150A may provide connectivity between network devices 110A and 110B.

Network device 110B establishes a virtual loopback interface and stores an association between the PIM service and an address of the virtual loopback interface. Network device 110A learns, via a routing protocol such as BGP, the address of the virtual loopback interface of Network device 110B associated with the PIM service between network devices 110A, 110B for the multicast service. In some examples, the address of the virtual loopback interface of network device 110B is used as a service identifier for the PIM service between network devices 110A, 110B for the multicast service.

Network device 110A receives, from the multicast sender device 100A via the L2 network 140A, a multicast packet for the multicast group associated with the multicast service (400). Network device 110A generates, based at least in part on the multicast packet, a unicast L3 packet including a PIM register request destined to a RP device and configured to register network device 110A as a multicast source for the multicast group (402). The header of the unicast L3 packet specifies a source address including a network address translation (NAT) to the address of the virtual loopback interface of network device 110B. In some examples, network device 110A performs a NAT of an address of the multicast sender device to the address of the virtual loopback interface of network device 110B. In some examples, network device 110A performs a NAT of an address of network device 110A to the address of the virtual loopback interface of network device 110B. Network device 110A forwards the unicast L3 packet to network device 110B across the L3 transport network 150A (404). An example of such a unicast L3 packet generated by network device 110A is described in FIG. 9.

Network device 110B receives the unicast L3 packet. Network device 110B determines, based at least in part on the stored association between the PIM service and the address of the virtual loopback interface of network device 110B, that the PIM register request is associated with the multicast group associated with the multicast service. Network device 110B registers network device 110A as a multicast source for the multicast group associated with the multicast service, e.g., by storing data associating network device 110A with the multicast group for the multicast service and indicating that network device 110A is a multicast source for this group/service.

FIG. 5 is a flow diagram illustrating an example operation in accordance with the techniques of the disclosure. FIG. 5 is described with respect to FIG. 1 for purposes of example. As depicted in the example of FIG. 5, network devices 110 exchange PIM messages across an L3 transport network, such as one or more service provider networks 150.

Network device 110B defines a PIM service between network device 110B and network device 110A for a multicast service (500). In some examples, network device 110B is configured by an administrator to define a PIM service for each multicast service supported by network device 110B. In some examples, network device 110B defines a plurality of PIM services that include a different PIM service between network device 110B and network device 110A for each multicast service of a plurality of different multicast services between, e.g., different ones of client devices 100. In some examples, in defining the PIM services, network device 110B represents each PIM service with a different identifier, such as an integer or text string, and generates mapping data between a given PIM service's identifier and a corresponding multicast service.

Further, network device 110B establishes a virtual loopback interface of network device 110B (502). Typically, network device 110B may establish a different virtual loopback interface for each different PIM service defined by network device 110B. In some examples, network device 110B generates mapping data indicating an association between the PIM service identifier and a network address of the virtual loopback interface. Network device 110B stores an association between the PIM service and an address of the virtual loopback interface (504). In some examples, network device 110B stores the mapping data between the PIM service and the address of the virtual loopback interface in storage media, such as storage devices 208 of FIG. 2. Network device 110B may advertise the association between the PIM service identifier and a network address of the virtual loopback interface to other network devices, such as to BGP peers via BGP sessions with the BGP peers. In some examples, network device 110B advertises the association to network device 110A.

Network device 110B receives, from network device 110A via an L3 transport network such as service provider network 150A, a unicast L3 packet (506). A header of the unicast L3 packet specifies a source address being the address of the virtual loopback interface of the network device 110B. The unicast L3 packet further includes (e.g., contained in a payload of the unicast L3 packet) a PIM Register request destined to an RP device. The PIM register request is configured to enable a recipient to register network device 110A as a multicast source for a multicast group associated with the multicast service. An example of such a unicast L3 packet received by network device 110B is described in FIG. 9.

Network device 110B registers, based at least in part on the stored association between the PIM service and the address of the virtual loopback interface of network device 110A specified by the header of the unicast L3 packet, network device 110A as the multicast source for the multicast group associated with the multicast service (508). For example, network device 110B may use the address of the virtual loopback interface on which the unicast L3 packet was received and the mapping data between the PIM service and the address of the virtual loopback interface to identify a PIM service. Furthermore, the network device 110B may use the identified PIM service and the mapping data between the PIM service and a corresponding multicast service to identify the relevant multicast service. Network device 110B may thereafter use the PIM register request specified by the unicast L3 packet to register network device 110A as a multicast source for the multicast group associated with the identified multicast service. In some examples, network device 110B stores an association between network device 110A and the corresponding multicast group that indicates network device 110A as a multicast source for the multicast group. In some examples, network device 110B maintains a database of multicast groups. In this example, network device 110B adds network device 110A to a list of multicast sources of an entry for the corresponding multicast group within the database. In some examples, network device 110B may be configured to drop multicast packets received from network devices that are not identified as multicast sources for the multicast group within the database.

FIG. 6 is a flow diagram illustrating an example operation in accordance with the techniques of the disclosure. FIG. 6 is described with respect to FIG. 1 for purposes of example. As depicted in the example of FIG. 6, network devices 110 exchange PIM messages across an L3 transport network, such as one or more service provider networks 150.

In the example of FIG. 6, client device 100B operates as a multicast receiver device for a multicast group associated with a multicast service. Network device 110I receives, from client device 100B, a multicast join request for the multicast group (600). In some examples, the multicast join request is an IGMP multicast join request.

Network device 110I is configured to generate and send, based on the received multicast join request, and to network device 110H, a unicast L3 packet (602). The unicast L3 packet includes a header that includes (1) source address information, the source address information specifying address information of network device 110I, and (2) destination address information, the destination address information specifying address information of network device 110H. In some examples, the source address information specifies a virtual loopback interface of network device 110H. The virtual loopback interface of network device 110H may be associated with a PIM service between network device 110H and network device 110I for the multicast service associated with the multicast group.

The unicast L3 packet as generated by network device 110I further includes metadata specifying a session identifier for the multicast service associated with the multicast group specified by the IGMP multicast join request. In addition, the unicast L3 packet includes a payload containing a PIM join request destined to an RP device. The PIM join request is configured to subscribe network device 110I to the multicast group specified by the IGMP multicast join request. An example of such a unicast L3 packet generated by network device 110I is described in FIG. 10.

Network device 110H registers network device 110I as a multicast receiver for the multicast group. In some examples, network device 110H may use the virtual loopback interface of network device 110H specified by the unicast L3 packet and mapping data between a PIM service between network device 110H and network device 110I to identify a PIM service. Further, network device 110H may use the identified PIM service and mapping data between the PIM service and a multicast service to identify the multicast service. Network device 110H registers network device 110I as a multicast receiver for a multicast group associated with the identified multicast service.

In addition, network device 110H may forward the PIM join request toward an RP for the multicast service. For example, network device 110G may be one hop from network device 110H toward the RP. Network device 110H modifies the source information of the unicast L3 packet to specify address information of network device 110H, and modifies the destination address information of the unicast L3 packet to specify network device 110G. In some examples, the source address information specifies a virtual loopback interface of network device 110G. The virtual loopback interface of network device 110G may be associated with a PIM service between network device 110G and network device 110H for the multicast service associated with the multicast group. Network device 110H forwards the modified unicast L3 packet to network device 110G. Network device 110G may register network device 110G as a multicast receiver for the multicast group associated with the multicast service. In this fashion, each upstream network device 110 towards the RP (and the RP itself) may register a downstream network device 110 as a receiver for the multicast group associated with a particular multicast service.

FIG. 7 is a flow diagram illustrating an example operation in accordance with the techniques of the disclosure. FIG. 7 is described with respect to FIG. 1 for convenience. As depicted in the example of FIG. 7, network devices 110 exchange PIM messages across an L3 transport network, such as one or more service provider networks 150.

Network device 110A receives, from client device 100A (acting as a multicast source or multicast sender device), a multicast packet for a multicast group associated with a multicast service (700).

Network device 110A generates, based on the received multicast packet, a unicast L3 packet and sends the unicast L3 packet to network device 110B (702). The unicast L3 packet includes a header, which includes (1) source address information specifying address information of network device 110A, and (2) destination address information specifying address information of network device 110B. The unicast L3 packet further includes metadata specifying a session identifier for the multicast service associated with the multicast group specified by the received multicast packet. Furthermore, the unicast L3 packet includes a PIM Register request configured to register network device 110A as a multicast source for the multicast group specified by the received multicast packet. An example of such a unicast L3 packet generated by network device 110A is described in FIG. 9.

As described above with respect to FIG. 5, network device 110B registers, based at least in part on PIM Register request specified by the unicast L3 packet, network device 110A as a multicast source for the multicast group associated with the multicast service. In some examples, network device 110B stores an association between network device 110A and the corresponding multicast group that indicates network device 110A as a multicast source for the multicast group. In some examples, network device 110B maintains a database of multicast groups. In this example, network device 110B adds network device 110A to a list of multicast sources of an entry for the corresponding multicast group within the database. In some examples, network device 110B may be configured to drop multicast packets received from network devices that are not identified as multicast sources for the multicast group within the database.

FIG. 8 is a flow diagram illustrating an example operation in accordance with the techniques of the disclosure. FIG. 8 is described with respect to FIG. 3B for convenience. As depicted in the example of FIG. 8, router 362A operates as a hub network device and routers 360 operate as branch routers providing connectivity to one or more client devices, such as servers 366.

Branch router 360B connected to a multicast source device (e.g., server 366B) receives a multicast packet for the multicast group from the multicast source device (e.g., server 366B). Branch router 360B stores multicast state information specifying the multicast source device 366B as a sender for the multicast group.

Branch router 360B generates a PIM Register message that includes the multicast packet and sends, via session-based routing, the PIM Register message to the RP (e.g., PE router 354B). In some examples, branch router 360B forms a first unicast L3 packet and sends the first unicast L3 packet to hub router 362B, and hub router 362B receives the first unicast L3 packet (802). The first unicast L3 packet includes source address information specifying an address of branch router 360B and destination address information specifying an address of hub router 362B. The first unicast L3 packet further includes metadata specifying a session identifier for a multicast service associated with the multicast group and a payload including the PIM Register request. The PIM Register request is configured to register branch router 360B as a sender for the multicast group. An example of such a first unicast L3 packet sent by branch router 360B is described in FIG. 9. In some examples, hub router 362B forwards the PIM Register request encapsulated by the first unicast L3 packet to the RP, which may be external to the network (e.g., or data center 356A). For subsequent multicast packets, branch router 360B may omit metadata from unicast L3 packets encapsulating corresponding multicast packets.

In addition, branch router 360A connected to a multicast receiver device (e.g., server 366A) receives an IGMP multicast group join request from the multicast receiver device 366A. Branch router 360A stores multicast state information specifying multicast receiver device 366A as a member of the multicast group.

Branch router 360A generates a PIM join request and sends, via session-based routing, the PIM join request to the RP (PE router 354B). In some examples, branch router 360A forms a second unicast L3 packet and sends the second unicast L3 packet to hub router 362B, and hub router 362B receives the second unicast L3 packet (802). In some examples, the second unicast L3 packet includes source address information specifying an address of branch router 360A and destination address information specifying an address of hub router 362B. The second unicast L3 packet further includes metadata specifying a session identifier for a multicast service associated with the multicast group and a payload including the PIM join request. An example of such a second unicast L3 packet sent by branch router 360A is described in FIG. 10. The PIM join request is configured to subscribe branch router 360A to a multicast group associated with the multicast service. In some examples, hub router 362B forwards the PIM join request encapsulated by the second unicast L3 packet to the RP (e.g., PE router 354B), which may be external to the network (or external to data center 356A).

Hub router 362B generates and stores, based at least in part on the PIM Register request specified by the first unicast L3 packet and the PIM join request specified by the second L3 unicast packet, a multicast route for the multicast service (804). For example, hub router 362B determines, based on the session identifier specified by the first unicast L3 packet, the multicast service associated with the multicast group. Hub router 362B determines, based on the PIM Register request, that branch router 360B is a multicast source for a multicast group associated with the identified multicast service. Furthermore, hub router 362B determines, based on the session identifier specified by the second unicast L3 packet, the multicast service associated with the multicast group. Hub router 362B determines, based on the PIM join request, that branch router 360A is subscribed to the multicast group associated with the identified multicast service. Hub router 362B generates and stores a multicast route specifying branch router 360B as associated with a multicast source device for the multicast group and branch router 360A as associated with a multicast receiver device for the multicast group.

Figure 9:
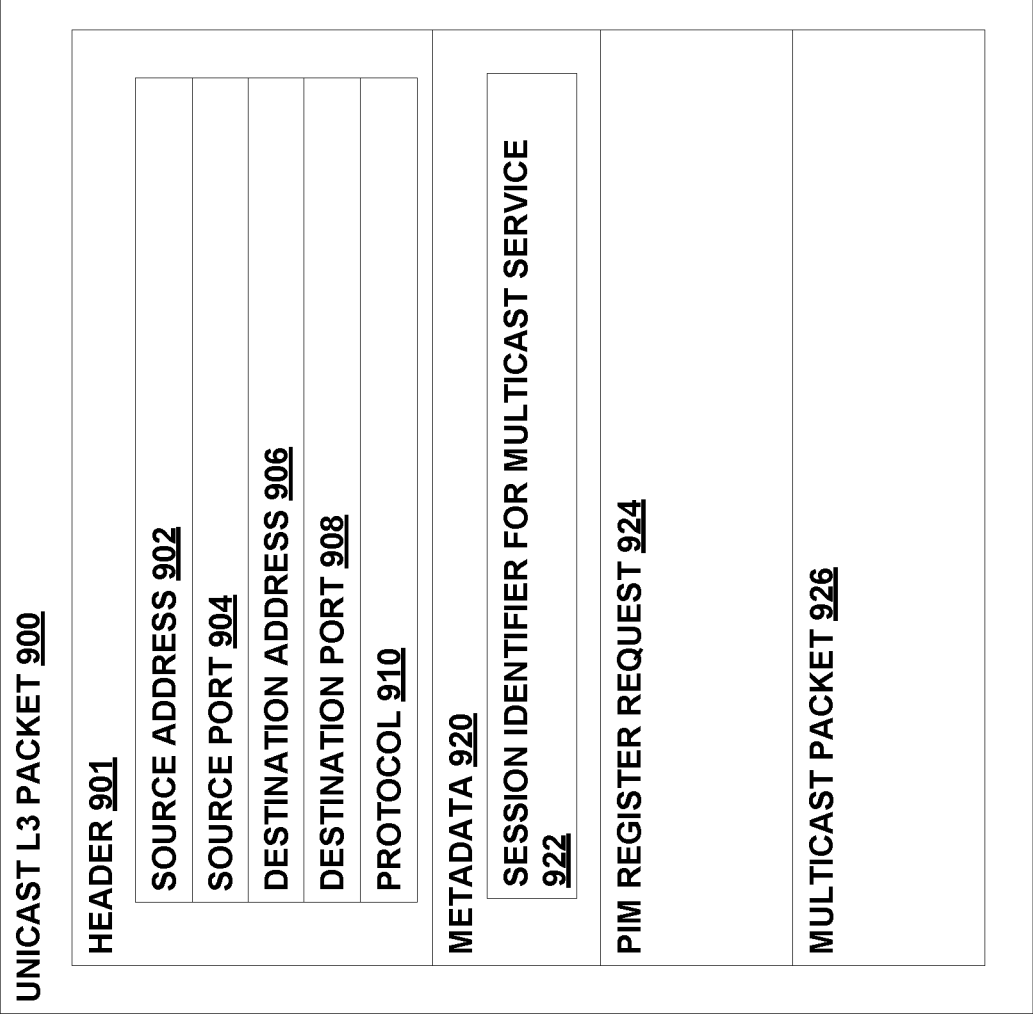
FIG. 9 is a block diagram illustrating an example unicast L3 packet encapsulating a PIM register request in accordance with the techniques of the disclosure.

FIG. 9 is a block diagram illustrating an example unicast L3 packet 900 encapsulating a PIM register request in accordance with the techniques of the disclosure. As depicted in the example of FIG. 9, unicast L3 packet 900 includes a header 901. Header 901 specifies a source address 902 that is an address of a source network device (e.g., network device 110A of FIG. 1), a source port 904 that is a port of the source network device, a destination address 906 that is an address of a destination network device (e.g., network device 110B of FIG. 1), a destination port 908 that is a port of the destination network device, and a network protocol 910. In some examples, source address 902 specifies an address that is a NAT of an address of a virtual loopback interface of the destination device (e.g., network device 110B), the virtual loopback interface associated with a PIM service between the source network device and the destination network device established for a multicast service.

Unicast L3 packet 900 further includes metadata 920. Metadata 920 comprises a session identifier for the multicast service for which the PIM service is established.

Unicast L3 packet 900 encapsulates PIM register request 924. PIM register request 924 is configured to register the source network device (e.g., network device 110A) with the RP as a multicast source for a multicast group associated with the multicast service specified by session identifier 922. In addition, PIM register request 924 encapsulates multicast packet 926, which originates from a multicast source device (e.g., client device 100A of FIG. 1) and is destined for a multicast receiver device (e.g., client device 100B of FIG. 1). Multicast packet 926 is sent by the multicast source device (e.g., client device 100A) to a multicast group associated with the multicast service, the multicast group including the multicast receiver device (e.g., client device 100B)

FIG. 10 is a block diagram illustrating an example unicast L3 packet 1000 encapsulating a PIM join request in accordance with the techniques of the disclosure. As depicted in the example of FIG. 10, unicast L3 packet 1000 includes a header 1001. Header 1001 specifies a source address 1002 that is an address of a source network device (e.g., network device 110B of FIG. 1), a source port 1004 that is a port of the source network device, a destination address 1006 that is an address of a destination network device (e.g., network device 110A of FIG. 1), a destination port 1008 that is a port of the destination network device, and a network protocol 1010. In some examples, source address 1002 specifies an address that is a NAT of an address of a virtual loopback interface of the destination device (e.g., network device 110A), the virtual loopback interface associated with a PIM service between the source network device and the destination network device established for a multicast service.

Unicast L3 packet 1000 further includes metadata 1020. Metadata 1020 comprises a session identifier for the multicast service for which the PIM service is established.

Unicast L3 packet 1000 encapsulates PIM join request 1024. PIM join request 1024 is configured to register the source network device (e.g., network device 110B) with the RP as a multicast receiver for a multicast group associated with the multicast service specified by session identifier 1022. PIM join request 1024 may be sent by the source network device in response to receiving an IGMP group join request from a multicast receiver device (e.g., client device 100B of FIG. 1). The IGMP group join request is configured to subscribe the multicast receiver device (e.g., client device 100B) to the multicast group associated with the multicast service.

The following examples may illustrate one or more aspects of the disclosure.

Example 1. A first network system comprising: storage media; and processing circuitry in communication with the storage media, the processing circuitry configured to: define Protocol Independent Multicast (PIM) services between the first network system and a second network device, each of the PIM services associated with a respective multicast service of a plurality of multicast services; establish virtual loopback interfaces of the first network system, each of the virtual loopback interfaces corresponding to a respective one of the PIM services; and store an association between an address of each of the virtual loopback interfaces and the corresponding PIM service of the PIM services. In some examples, the processing circuitry may further be configured to: receive, from the second network device via a Layer-3 (L3) transport network, a unicast L3 packet comprising: a header specifying a source address that is the address of a first virtual loopback interface of the virtual loopback interfaces; and a payload comprising a PIM Register request destined to a Rendezvous Point (RP) device for a multicast group to register the second network device as a multicast source for the multicast group; and register, based at least in part on an association between the address of the first virtual loopback interface specified by the header of the unicast L3 packet and a first PIM service of the PIM services, the second network device as the multicast source for the multicast group, the multicast group associated with a first multicast service of the plurality of multicast services that is associated with the first PIM service. In some cases, the processing circuitry may be configured to prune a multicast tree for the multicast group based on registering the second network device as a multicast source.

Example 2. The first network system of example 1, wherein the address of the first virtual loopback interface comprises a service identifier for the first PIM service between the first network system and the second network device.

Example 3. The first network system of any of examples 1 through 2, wherein, prior to receiving the unicast L3 packet, the processing circuitry is configured to advertise, to the second network device via a routing protocol, the association between the address of the first virtual loopback interface and the first PIM service.

Example 4. The first network system of example 3, wherein the routing protocol is Border Gateway Protocol (BGP).

Example 5. The first network system of any of examples 1 through 4, wherein to receive the unicast L3 packet, the processing circuitry is configured to: receive, via an Multi-protocol Label Switching (MPLS) transport network, the unicast L3 packet, wherein the unicast L3 packet is encapsulated with one or more MPLS labels.

Example 6. A first network system comprising: storage media; and processing circuitry in communication with the storage media, the processing circuitry configured to: receive, from a multicast sender device connected to the first network device via a Layer-2 (L2) network, a multicast packet for a multicast group associated with a multicast service; generate, based at least in part on the multicast packet, a unicast Layer-3 (L3) packet comprising: a header that specifies a source address that is an address of a virtual loopback interface of a second network device, the virtual loopback interface associated with a PIM service between the first network device and the second network device for the multicast service, and a payload containing a Protocol Independent Multicast (PIM) Register request destined to a Rendezvous Point (RP) device for the multicast service to register the first network device as a multicast source for the multicast group; and forward the unicast L3 packet across an L3 transport network to the second network device.

Example 7. The first network system of example 6, wherein the processing circuitry is further configured to: learn, from the second network device via a routing protocol session between the first network device and the second network device, the address of the virtual loopback interface of the second network device associated with the PIM service between the first network device and the second network device for the multicast service.

Example 8. The first network system of example 7, wherein the routing protocol is Border Gateway Protocol (BGP).

Example 9. The first network system of any of examples 6 through 8, wherein the processing circuitry is further configured to: define a second PIM service; establish a second virtual loopback interface; store an association between the second PIM service and an address of the second virtual loopback interface; and advertise, to the second network device, the association between the second PIM service and an address of the second virtual loopback interface.

Example 10. The first network system of any of examples 6 through 9, wherein to forward the unicast L3 packet across the transport network to the second network device, the processing circuitry is configured to: perform session-based routing to forward the unicast L3 packet across a session-based routing transport network by: modifying the header of the unicast L3 packet to specify an address of the first network device as the source address and an address of the second network device as a destination address; and adding, to the unicast L3 packet, metadata specifying the address of the virtual loopback interface of the second network device.

Example 11. The first network system of any of examples 6 through 10, wherein to forward the unicast L3 packet across the transport network to the second network device, the processing circuitry is configured to: forward the unicast L3 packet across a Multiprotocol Label Switching (MPLS) transport network by encapsulating the unicast L3 packet with one or more MPLS labels.

Example 12. The first network system of any of examples 6 through 11, wherein the address of the virtual loopback interface of the second network device comprises a service identifier for the PIM service between the first network device and the second network device for the multicast service Example 13. A method comprising: receiving, by a first network device and from a multicast sender device connected to the first network device via a Layer-2 (L2) network, a multicast packet for a multicast group associated with a multicast service; generating, by the first network device and based at least in part on the multicast packet, a unicast Layer-3 (L3) packet comprising a Protocol Independent Multicast (PIM) Register request destined to a Rendezvous Point (RP) device and configured to register the first network device as a multicast source for the multicast group, wherein a header of the unicast L3 packet specifies a source address comprising a network address translation (NAT) to an address of a virtual loopback interface of a second network device, the virtual loopback interface associated with a PIM service between the first network device and the second network device for the multicast service, and forwarding, by the first network device, the unicast L3 packet across an L3 transport network to the second network device.

Example 14. The method of example 13, further comprising: learning, by the first network device and from the second network device via a routing protocol, the address of the virtual loopback interface of the second network device associated with the PIM service between the first network device and the second network device for the multicast service.

Example 15. The method of example 14, wherein the routing protocol is Border Gateway Protocol (BGP).

Example 16. The method of any of examples 13 through 15, further comprising: defining, by the first network device, a second PIM service; establishing, by the first network device, a second virtual loopback interface; and storing, by the first network device, an association between the second PIM service and an address of the second virtual loopback interface.

Example 17. The method of any of examples 13 through 16, wherein forwarding the unicast L3 packet across the transport network to the second network device comprises: performing session-based routing to forward the unicast L3 packet across a session-based routing transport network by: modifying the header of the unicast L3 packet to specify an address of the first network device as the source address and an address of the second network device as a destination address; and adding, to the unicast L3 packet, metadata specifying the address of the virtual loopback interface of the second network device.

Example 18. The method of any of examples 13 through 17, wherein forwarding the unicast L3 packet across the transport network to the second network device comprises: forwarding the unicast L3 packet across an Multiprotocol Label Switching (MPLS) transport network by encapsulating the unicast L3 packet with one or more MPLS labels.

Example 19. The method of any of examples 13 through 18, wherein the address of the virtual loopback interface of the second network device comprises a service identifier for the PIM service between the first network device and the second network device for the multicast service.

Example 20. Non-transitory, computer-readable media comprising instructions that, when executed, are configured to cause processing circuitry of a first network system to: receive, from a multicast sender device connected to the first network device via a Layer-2 (L2) network, a multicast packet for a multicast group associated with a multicast service; generate, based at least in part on the multicast packet, a unicast Layer-3 (L3) packet comprising: a header that specifies a source address that is an address of a virtual loopback interface of a second network device, the virtual loopback interface associated with a PIM service between the first network device and the second network device for the multicast service, and a payload containing a Protocol Independent Multicast (PIM) Register request destined to a Rendezvous Point (RP) device for the multicast service to register the first network device as a multicast source for the multicast group; and forward the unicast L3 packet across an L3 transport network to the second network device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A first network device comprising:
storage media; and
processing circuitry in communication with the storage media, the processing circuitry configured to:
receive, from a multicast sender device connected to the first network device via a Layer-2 (L2) network, a multicast packet for a multicast group associated with a multicast service;
generate, based at least in part on the multicast packet, a unicast Layer-3 (L3) packet comprising:
a header that specifies a source address as an address of a virtual loopback interface of a second network device to which the unicast L3 packet is destined, wherein the virtual loopback interface identifies a PIM service for the multicast service, the PIM service being one of a plurality of PIM services between the first network device and the second network device, and the virtual loopback interface being one of a plurality of virtual lookback interfaces of the second network device, wherein each virtual loopback interface of the plurality of virtual loopback interfaces identifies a different PIM service of the plurality of PIM services, and
a payload comprising a Protocol Independent Multicast (PIM) Register request destined to a Rendezvous Point (RP) device for the multicast service to register the first network device as a multicast source for the multicast group, wherein the multicast sender device, the first network device, the second network device, and the RP device are distinct from one another; and
forward the unicast L3 packet across an L3 transport network to the second network device.

2. The first network device of claim 1, wherein the processing circuitry is further configured to:
learn, from the second network device via a routing protocol session between the first network device and the second network device, the address of the virtual loopback interface of the second network device.

3. The first network device of claim 2, wherein the routing protocol session is a Border Gateway Protocol (BGP) session.

4. The first network device of claim 1,
wherein the multicast service comprises a first multicast service,
wherein the virtual loopback interface of the second network device is a first virtual loopback interface and the PIM service is a first PIM service of the plurality of PIM services, and
wherein the processing circuitry is further configured to:
define a second PIM service for a second multicast service of the plurality of PIM services, the second multicast service distinct from the first multicast service;
establish a second virtual loopback interface that identifies the second PIM service;
store an association between the second PIM service and an address of the second virtual loopback interface; and
advertise, to the second network device, the association between the second PIM service and the address of the second virtual loopback interface.

5. The first network device of claim 1, wherein to forward the unicast L3 packet across the L3 transport network to the second network device, the processing circuitry is configured to:

perform session-based routing to forward the unicast L3 packet across a session-based routing transport network by:
modifying the header of the unicast L3 packet to specify an address of the first network device as the source address and an address of the second network device as a destination address; and
adding, to the unicast L3 packet, metadata specifying the address of the virtual loopback interface of the second network device.

6. The first network device of claim 1, wherein to forward the unicast L3 packet across the L3 transport network to the second network device, the processing circuitry is configured to:
forward the unicast L3 packet across a Multiprotocol Label Switching (MPLS) transport network by encapsulating the unicast L3 packet with one or more MPLS labels.

7. The first network device of claim 1, wherein the address of the virtual loopback interface of the second network device comprises a service identifier that identifies the PIM service between the first network device and the second network device.

8. The first network device of claim 1, wherein the header of the unicast L3 packet further specifies a destination address as an address of the second network device.

9. A method comprising:
receiving, by a first network device and from a multicast sender device connected to the first network device via a Layer-2 (L2) network, a multicast packet for a multicast group associated with a multicast service;
generating, by the first network device and based at least in part on the multicast packet, a unicast Layer-3 (L3) packet comprising:
a header that specifies a source address as an address of a virtual loopback interface of a second network device to which the unicast L3 packet is destined, wherein the virtual loopback interface identifies a PIM service for the multicast service, the PIM service being one of a plurality of PIM services between the first network device and the second network device, and the virtual loopback interface being one of a plurality of virtual lookback interfaces of the second network device, wherein each virtual loopback interface of the plurality of virtual loopback interfaces identifies a different PIM service of the plurality of PIM services; and
a payload comprising a Protocol Independent Multicast (PIM) Register request destined to a Rendezvous Point (RP) device for the multicast service to register the first network device as a multicast source for the multicast group, wherein the multicast sender device, the first network device, the second network device, and the RP device are distinct from one another; and
forwarding, by the first network device, the unicast L3 packet across an L3 transport network to the second network device.

10. The method of claim 9, further comprising:
learning, by the first network device and from the second network device via a routing protocol session between the first network device and the second network device, the address of the virtual loopback interface of the second network device.

11. The method of claim 10, wherein the routing protocol session is a Border Gateway Protocol (BGP) session.

12. The method of claim 9,
wherein the multicast service comprises a first multicast service,
wherein the virtual loopback interface of the second network device is a first virtual loopback interface and the PIM service is a first PIM service of the plurality of PIM services, and
wherein the method further comprises:
  defining, by the first network device, a second PIM service for a second multicast service of the plurality of PIM services, the second multicast service distinct from the first multicast service;
  establishing, by the first network device, a second virtual loopback interface that identifies the second PIM service;
  storing, by the first network device, an association between the second PIM service and an address of the second virtual loopback interface; and
  advertising, by the first network device, to the second network device, the association between the second PIM service and the address of the second virtual loopback interface.
13. The method of claim 9, wherein forwarding the unicast L3 packet across the L3 transport network to the second network device comprises:
  performing session-based routing to forward the unicast L3 packet across a session-based routing transport network by:
    modifying the header of the unicast L3 packet to specify an address of the first network device as the source address and an address of the second network device as a destination address; and
    adding, to the unicast L3 packet, metadata specifying the address of the virtual loopback interface of the second network device.
14. The method of claim 9, wherein forwarding the unicast L3 packet across the L3 transport network to the second network device comprises:
  forwarding the unicast L3 packet across an Multiprotocol Label Switching (MPLS) transport network by encapsulating the unicast L3 packet with one or more MPLS labels.
15. The method of claim 9, wherein the address of the virtual loopback interface of the second network device comprises a service identifier that identifies the PIM service between the first network device and the second network device.
16. Non-transitory, computer-readable media comprising instructions that, when executed, are configured to cause processing circuitry of a first network device to:
  receive, from a multicast sender device connected to the first network device via a Layer-2 (L2) network, a multicast packet for a multicast group associated with a multicast service;
  generate, based at least in part on the multicast packet, a unicast Layer-3 (L3) packet comprising:
    a header that specifies a source address as an address of a virtual loopback interface of a second network device to which the unicast L3 packet is destined, wherein the virtual loopback interface identifies a PIM service for the multicast service, the PIM service being one of a plurality of PIM services between the first network device and the second network device, and the virtual loopback interface being one of a plurality of virtual lookback interfaces of the second network device, wherein each virtual loopback interface of the plurality of virtual loopback interfaces identifies a different PIM service of the plurality of PIM services; and
    a payload comprising a Protocol Independent Multicast (PIM) Register request destined to a Rendezvous Point (RP) device for the multicast service to register the first network device as a multicast source for the multicast group, wherein the multicast sender device, the first network device, the second network device, and the RP device are distinct from one another; and
  forward the unicast L3 packet across an L3 transport network to the second network device.
17. The computer-readable media of claim 16, wherein the instructions are further configured to cause the processing circuitry to:
  learn, from the second network device via a routing protocol session between the first network device and the second network device, the address of the virtual loopback interface of the second network device.
18. The computer-readable media of claim 16,
wherein the multicast service comprises a first multicast service,
wherein the virtual loopback interface of the second network device is a first virtual loopback interface and the PIM service is a first PIM service of the plurality of PIM services, and
wherein the instructions are further configured to cause the processing circuitry to:
  define a second PIM service for a second multicast service of the plurality of PIM services, the second multicast service distinct from the first multicast service;
  establish a second virtual loopback interface that identifies the second PIM service;
  store an association between the second PIM service and an address of the second virtual loopback interface; and
  advertise, to the second network device, the association between the second PIM service and the address of the second virtual loopback interface.
19. The computer-readable media of claim 16, wherein to forward the unicast L3 packet across the L3 transport network to the second network device, the instructions are configured to cause the processing circuitry to:
  perform session-based routing to forward the unicast L3 packet across a session-based routing transport network by:
    modifying the header of the unicast L3 packet to specify an address of the first network device as the source address and an address of the second network device as a destination address; and
    adding, to the unicast L3 packet, metadata specifying the address of the virtual loopback interface of the second network device.
20. The computer-readable media of claim 16, wherein to forward the unicast L3 packet across the L3 transport network to the second network device, the instructions are configured to cause the processing circuitry to:
  forward the unicast L3 packet across a Multiprotocol Label Switching (MPLS) transport network by encapsulating the unicast L3 packet with one or more MPLS labels.

21. The computer-readable media of claim 16, wherein the address of the virtual loopback interface of the second network device comprises a service identifier service identifier that identifies the PIM service between the first network device and the second network device.

* * * * *